United States Patent
Kato et al.

(10) Patent No.: US 10,955,680 B2
(45) Date of Patent: Mar. 23, 2021

(54) METHOD OF PRODUCING THERMOPLASTIC RESIN

(71) Applicant: MITSUBISHI GAS CHEMICAL COMPANY, INC., Tokyo (JP)

(72) Inventors: Noriyuki Kato, Tokyo (JP); Mitsuteru Kondo, Tokyo (JP); Munenori Shiratake, Tokyo (JP); Kentaro Ishihara, Tokyo (JP); Koji Hirose, Tokyo (JP); Shinya Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 227 days.

(21) Appl. No.: 15/769,182

(22) PCT Filed: Nov. 2, 2016

(86) PCT No.: PCT/JP2016/082615
§ 371 (c)(1),
(2) Date: Apr. 18, 2018

(87) PCT Pub. No.: WO2017/078074
PCT Pub. Date: May 11, 2017

(65) Prior Publication Data
US 2018/0307052 A1    Oct. 25, 2018

(30) Foreign Application Priority Data

Nov. 4, 2015    (JP) .............................. JP2015-216978

(51) Int. Cl.
*C08G 63/199*        (2006.01)
*G02B 27/09*         (2006.01)
(Continued)

(52) U.S. Cl.
CPC ....... *G02B 27/0955* (2013.01); *C08G 63/199* (2013.01); *C08G 63/64* (2013.01); *C08G 64/06* (2013.01); *C08G 64/16* (2013.01); *C08G 64/30* (2013.01); *C08G 64/307* (2013.01); *C08L 69/005* (2013.01); *G02B 1/04* (2013.01); *G02B 1/041* (2013.01); *C08L 2203/16* (2013.01)

(58) Field of Classification Search
USPC .................................................. 528/196, 198
See application file for complete search history.

(56) References Cited

U.S. PATENT DOCUMENTS

| 2010/0105961 A1 | 4/2010 | Fujii et al. |
| 2012/0029244 A1 | 2/2012 | Fujii et al. |

(Continued)

FOREIGN PATENT DOCUMENTS

| JP | H10-101786 A | 4/1998 |
| JP | 2010-248095 | 11/2010 |

(Continued)

OTHER PUBLICATIONS

International Search Report issued in International Bureau of WIPO Patent Application No. PCT/JP2016/082615, dated Feb. 7, 2017.
Third Party Observation submitted in International Bureau of WIPO Patent Application No. PCT/JP2016/082615 on Nov. 10, 2017, and also submitted in European Patent Application EP16862134.0 on Jun. 7, 2018.

*Primary Examiner* — Terressa Boykin
(74) *Attorney, Agent, or Firm* — Greenblum & Bernstein, P.L.C.

(57) ABSTRACT

The present invention provides a method for producing a thermoplastic resin by reacting reactants comprising a dihydroxy compound. In this production method, the dihydroxy compound comprises a dihydroxy compound represented by the following formula (1), and at least one of a compound represented by the following formula (A), a compound represented by the following formula (B), and a compound represented by the following formula (C), wherein the total weight of the compound represented by the formula (A), the compound represented by the formula (B), and the compound represented by the formula (C) is 1,500 ppm or more, based on the weight (100 parts by weight) of the dihydroxy compound represented by the formula (1).

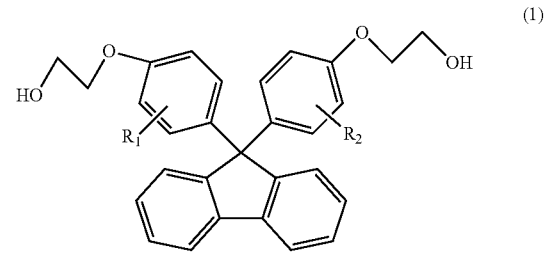

(1)

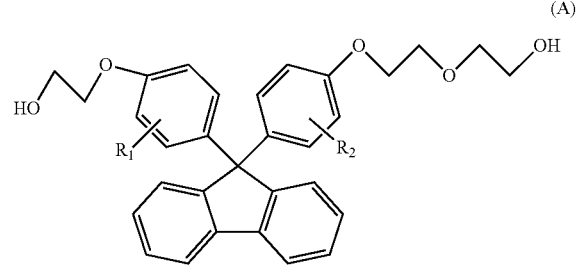

(A)

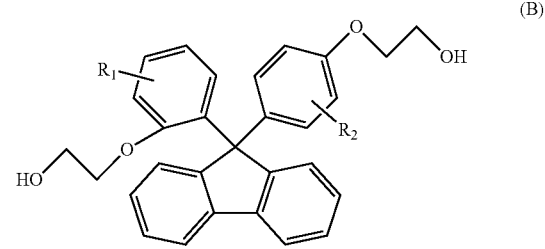

(B)

(Continued)

-continued

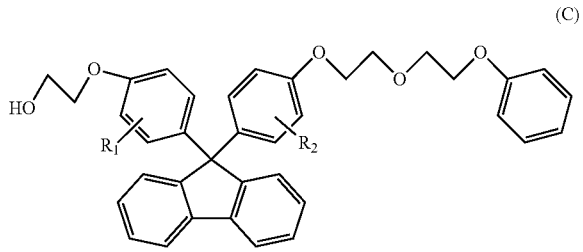

(C)

16 Claims, No Drawings

(51) Int. Cl.
*C08G 63/64* (2006.01)
*G02B 1/04* (2006.01)
*C08G 64/06* (2006.01)
*C08G 64/30* (2006.01)
*C08G 64/16* (2006.01)
*C08L 69/00* (2006.01)

(56) References Cited

U.S. PATENT DOCUMENTS

| | | |
|---|---|---|
| 2012/0123083 A1 | 5/2012 | Nunome et al. |
| 2015/0285954 A1 | 10/2015 | Isgizuka et al. |

FOREIGN PATENT DOCUMENTS

| | | |
|---|---|---|
| JP | 2012-77266 | 4/2012 |
| JP | 2014-169396 | 9/2014 |
| JP | 2014-214220 | 11/2014 |
| JP | 2014-214251 | 11/2014 |
| JP | 2014-221865 A | 11/2014 |
| TW | 200848398 A | 12/2008 |
| WO | 2011/010741 | 1/2011 |
| WO | 2014/073496 | 5/2014 |

METHOD OF PRODUCING THERMOPLASTIC RESIN

TECHNICAL FIELD

The present invention relates to a thermoplastic resin that is excellent in fluidity and tensile strength.

BACKGROUND ART

In recent years, electronic devices such as digital cameras, smart phones and tablets have become popular, and a demand for compact camera modules has been increased. For these camera modules, plastic lenses are preferably used, rather than glass lenses. This is because a plastic lens can be used in various forms such as a thin lens or an aspherical lens, and the plastic lens is inexpensive and the mass production thereof is easily carried out by injection molding.

For optical lenses, resins having various structures, which are to be replaced for glass, have been developed, and various monomers have been studied as raw materials therefor. Among optical transparent resins, an optical lens consisting of a thermoplastic transparent resin is advantageous in that it can be produced in a large amount by injection molding, and further in that the production of an aspherical lens is easy, and thus, it is presently used as a lens for cameras. Conventionally, as such an optical transparent resin, for example, polycarbonate consisting of bisphenol A (BPA) had been mainly used, but thereafter, polymers having a fluorene skeleton, such as 9,9-bis(4-(2-hydroxyethoxy)phenyl)fluorene (BPEF), have been developed (Patent Literatures 1 and 2). These resins having a fluorene skeleton have a high refractive index, and thus, they are preferably used as optical materials. However, these resins have been problematic in terms of fluidity or tensile strength. Accordingly, it has been desired to develop a thermoplastic resin, which is useful as an optical material and is excellent in fluidity and tensile strength.

CITATION LIST

Patent Literature

Patent Literature 1: International Publication WO2014/073496
Patent Literature 2: International Publication WO2011/010741

SUMMARY OF INVENTION

Technical Problem

It is an object of the present invention to provide a method for producing a thermoplastic resin that is excellent in fluidity and/or tensile strength.

Solution to Problem

As a result of intensive studies directed towards achieving the aforementioned object, the present inventors have found that the aforementioned object can be achieved by allowing a specific amount of specific dihydroxy compound to be present in a dihydroxy compound having a specific fluorene skeleton, thereby completing the present invention. Specifically, the present invention is, for example, as follows.

[1] A method for producing a thermoplastic resin by reacting reactants comprising a dihydroxy compound, wherein
the dihydroxy compound comprises
a dihydroxy compound represented by the following formula (1), and
at least one of a compound represented by the following formula (A), a compound represented by the following formula (B), and a compound represented by the following formula (C), wherein
the total weight of the compound represented by the formula (A), the compound represented by the formula (B), and the compound represented by the formula (C) is 1,500 ppm or more, based on the weight (100 parts by weight) of the dihydroxy compound represented by the formula (1),

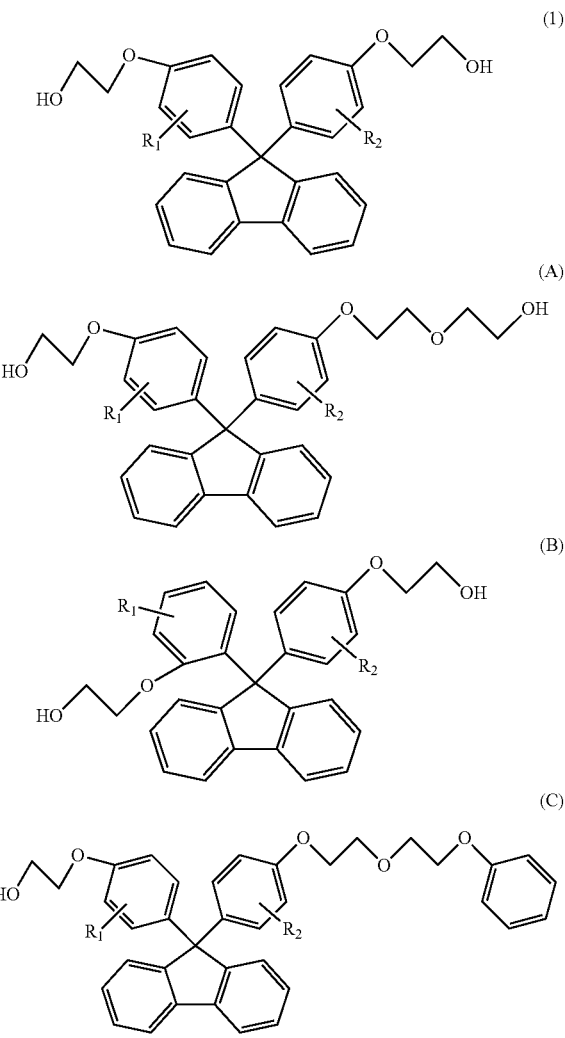

wherein $R_1$ and $R_2$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, and an aryloxy group containing 6 to 20 carbon atoms.

[2] The production method according to the above [1], wherein the weight of the compound represented by the formula (A) in the dihydroxy compound is 1,000 ppm or more, based on the weight (100 parts by weight) of the dihydroxy compound represented by the formula (1).

[3] The production method according to the above [1] or [2], wherein the weight of the compound represented by the formula (B) in the dihydroxy compound is 200 ppm or more, based on the weight (100 parts by weight) of the dihydroxy compound represented by the formula (1).

[4] The production method according to any one of the above [1] to [3], wherein the weight of the compound represented by the formula (C) in the dihydroxy compound is 200 ppm or more, based on the weight (100 parts by weight) of the dihydroxy compound represented by the formula (1).

[5] The production method according to any one of the above [1] to [4], wherein the dihydroxy compound further comprises at least one of a dihydroxy compound represented by the following formula (2) and a dihydroxy compound represented by the following formula (3):

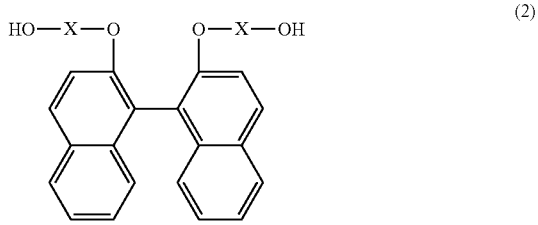

(2)

wherein X each independently represents an alkylene group containing 1 to 4 carbon atoms,

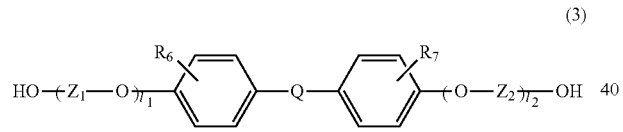

(3)

wherein $R_6$ and $R_7$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, an aryloxy group containing 6 to 20 carbon atoms, and a halogen atom;

$Z_1$ and $Z_2$ are each independently selected from the group consisting of an alkylene group containing 1 to 8 carbon atoms, a cycloalkylene group containing 6 to 10 carbon atoms, and an arylene group containing 6 to 10 carbon atoms;

$l_1$ and $l_2$ each independently represent an integer of 0 to 5;

Q represents a single bond or is selected from the group consisting of:

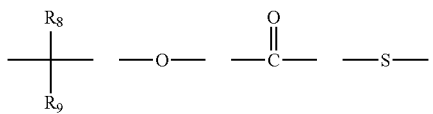

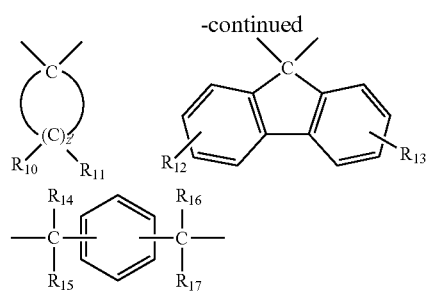

wherein $R_8$, $R_9$, and $R_{14}$ to $R_{17}$ are each independently selected from the group consisting of a hydrogen atom, an alkyl group containing 1 to 10 carbon atoms, and a phenyl group;

$R_{10}$ to $R_{13}$ each independently represent a hydrogen atom or an alkyl group containing 1 to 5 carbon atoms;

Z' represents an integer of 3 to 11; and $R_6$ and $R_7$ may be identical to or different from each other.

[6] The production method according to any one of the above [1] to [5], wherein X represents an ethylene group.

[7] The production method according to any one of the above [1] to [6], wherein the thermoplastic resin is selected from the group consisting of a polycarbonate resin, a polyester resin, and a polyester carbonate resin.

[8] The production method according to the above [7], wherein the thermoplastic resin is a polycarbonate resin.

[9] The production method according to any one of the above [1] to [8], wherein the reactants further comprise carbonic acid diester.

[10] The production method according to the above [7], wherein the thermoplastic resin is a polyester carbonate resin, the reactants comprise the dihydroxy compound; carbonic acid diester; and dicarboxylic acid comprising at least one selected from terephthalic acid, 2,6-naphthalenedicarboxylic acid, and fluorene-9,9-dipropionic acid, or derivative of the dicarboxylic acid; and the molar ratio between the dihydroxy compound and the dicarboxylic acid or a derivative thereof (dihydroxy compound/dicarboxylic acid or derivative thereof) is 20/80 to 95/5.

[11] The production method according to any one of the above [1] to [10], wherein tensile strength is 80% or more.

[12] A method for producing a molded body, comprising a step of molding a thermoplastic resin obtained by the production method according to any one of the above [1] to [11].

[13] A method for producing an optical material, which is characterized in that it uses a thermoplastic resin obtained by the production method according to any one of the above [1] to [11], or a molded body obtained by the production method according to the above [12].

[14] A method for producing an optical lens, which is characterized in that it uses a thermoplastic resin obtained by the production method according to any one of the above [1] to [11], or a molded body obtained by the production method according to the above [12].

[15] A method for producing an optical film, which is characterized in that it uses a thermoplastic resin obtained by the production method according to any one of the above [1] to [11], or a molded body obtained by the production method according to the above [12].

Effects of Invention

According to the present invention, a thermoplastic resin that is excellent in fluidity and/or tensile strength can be obtained.

DESCRIPTION OF EMBODIMENTS

Hereinafter, the present invention will be described in detail in the following embodiments, illustrations and the like. However, the present invention is not limited to these embodiments, illustrations and the like, and the present invention can be carried out by being arbitrarily modified in a range in which such modification is not deviated from the gist of the present invention.

One embodiment of the present invention relates to a method for producing a thermoplastic resin by reacting reactants comprising a dihydroxy compound, wherein the dihydroxy compound comprises a dihydroxy compound represented by the following formula (1), and at least one of a compound represented by the following formula (A), a compound represented by the following formula (B), and a compound represented by the following formula (C), wherein the total weight of the compound represented by the formula (A), the compound represented by the formula (B), and the compound represented by the formula (C) is 1,500 ppm or more, based on the weight (100 parts by weight) of the dihydroxy compound represented by the formula (1).

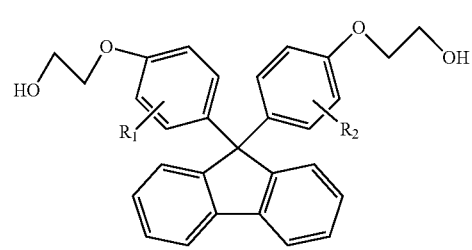

(1)

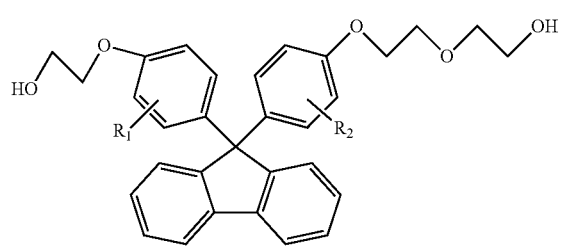

(A)

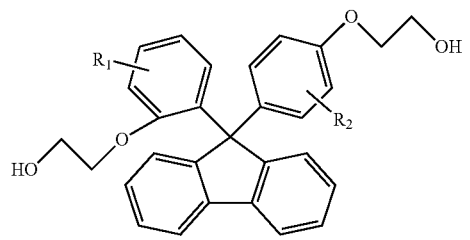

(B)

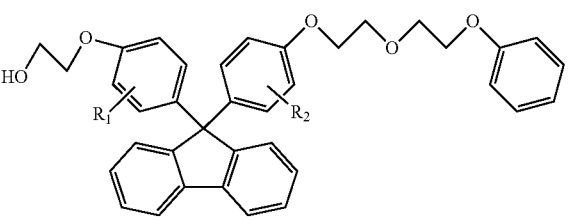

(C)

A thermoplastic resin having a constituting unit derived from the compound having a fluorene skeleton represented by the formula (1) has a high refractive index and is preferable as an optical material. At the same time, such a thermoplastic resin has been problematic in that its fluidity is small and its tensile strength is also small. The present inventors have found that reactants comprising the dihydroxy compound represented by the formula (1) and also, specific amounts of the compounds represented by the above formulae (A), (B), and (C), are used as monomers (raw materials), so that the compounds represented by the formulae (A), (B) and/or (C), and/or the polymers thereof function as plasticizers, and the fluidity and/or tensile strength of the thermoplastic resin can be thereby improved.

The compounds represented by the above formula (A), formula (B), and formula (C) may be generated as impurities in the process of synthesizing the dihydroxy compound represented by the formula (1). In general, in chemical reactions including polymerization reactions, the higher the chemical purity of a raw material, the better it is. In the present invention, however, a resin excellent in fluidity and tensile strength can be obtained from a raw material comprising trace amounts of the above-described components.

Besides, the dihydroxy compound represented by the formula (1) comprises, as impurities generated in the synthetic process, a plurality of by-product compounds having a fluorene structure, as well as the compounds represented by the formula (A), the formula (B), and the formula (C). Examples of the by-product compound other than the compounds represented by the formula (A), the formula (B), and the formula (C) are given below.

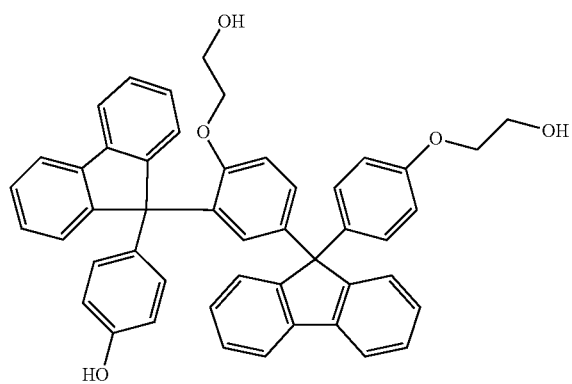
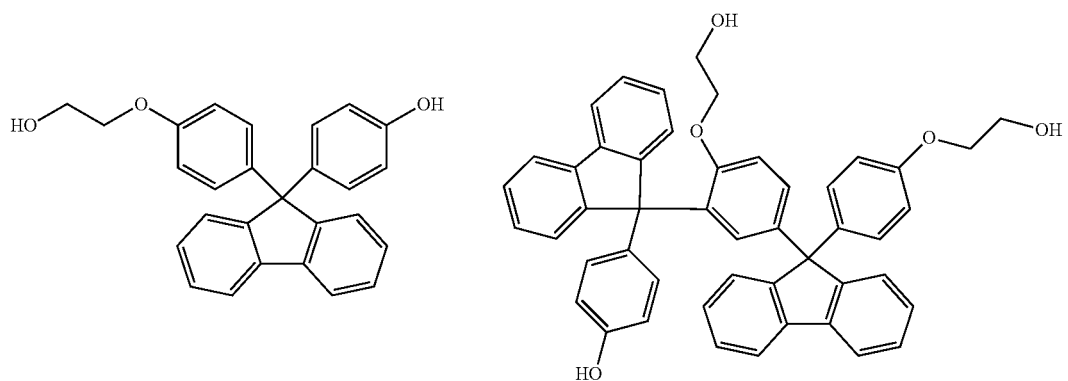
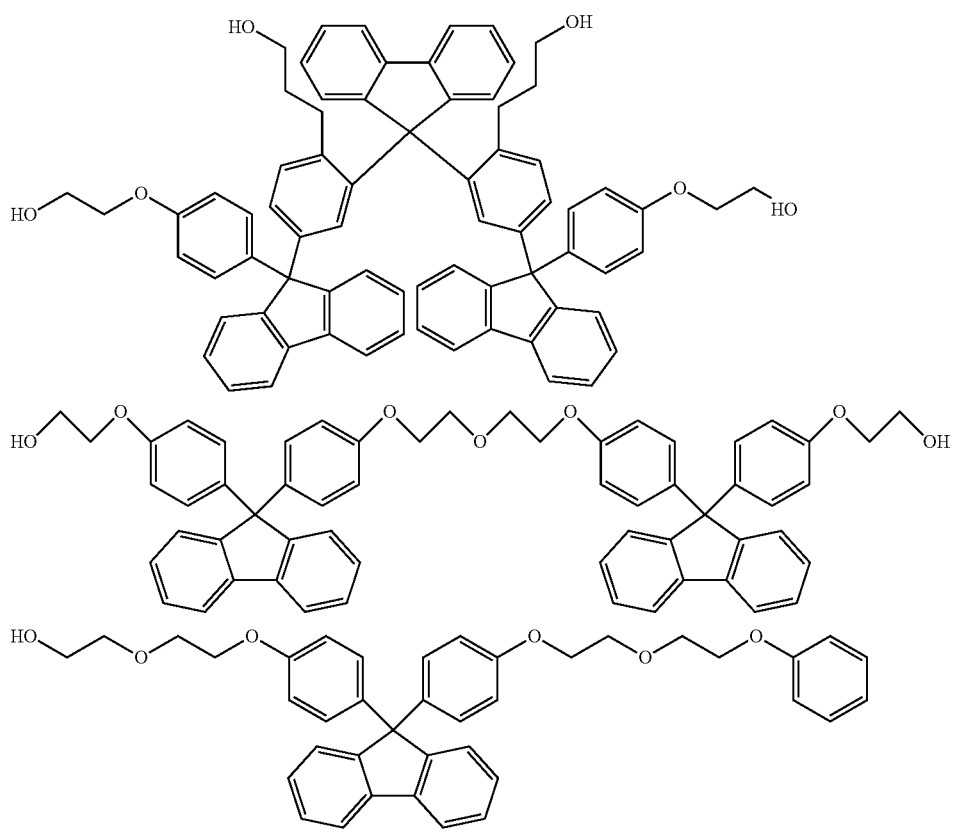

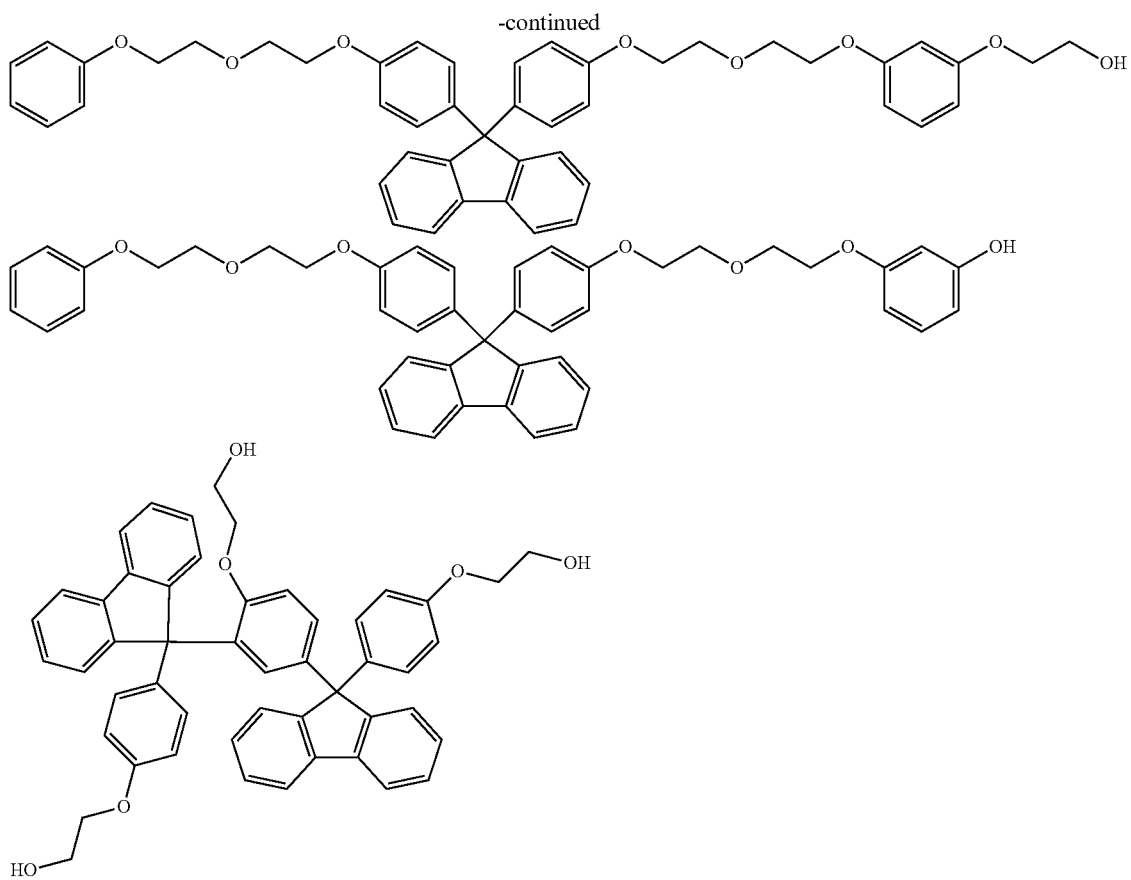

The present inventors have surprisingly found that, among impurities that should have been considered to be reduced, particularly, the compounds represented by the above formula (A), formula (B), and formula (C) have influence on fluidity or tensile strength. The inventors have discovered that the properties of the obtained resin can be improved by setting the total content of these compounds to be a predetermined amount or more.

The production method of the present invention is characterized in that the total weight of the compound represented by the formula (A), the compound represented by the formula (B), and the compound represented by the formula (C), which are comprised in the dihydroxy compound used as a raw material for a thermoplastic resin, is 1,500 ppm or more, based on 100 parts by weight of the dihydroxy compound represented by the formula (1). When the above-described total weight is 1,500 ppm or more, the fluidity and/or tensile properties of a thermoplastic resin can be improved. The above-described total weight of the compound represented by the formula (A), the compound represented by the formula (B), and the compound represented by the formula (C) is more preferably 2,000 ppm or more, and further preferably 3,000 ppm or more.

The upper limit of the above-described total weight of the compound represented by the formula (A), the compound represented by the formula (B), and the compound represented by the formula (C) is not particularly limited. Taking into consideration the points that the strength (e.g., impact strength) of a molded body is maintained upon the molding of the resin, that water absorbability is suppressed, and that heat resistance and/or moldability are maintained, the upper limit of the total weight is preferably 20,000 ppm or less, and more preferably 16,000 ppm or less.

From the viewpoint of the improvement of the fluidity and tensile strength of a thermoplastic resin, the weight of the compound represented by the formula (A) in a dihydroxy compound is preferably 1,000 ppm or more, more preferably 2,000 ppm or more, further preferably 2,500 ppm or more, and particularly preferably 3,000 ppm or more, based on the weight (100 parts by weight) of the dihydroxy compound represented by the formula (1). The upper limit is not particularly limited. Taking into consideration the suppression of water absorbability and the retention of heat resistance and/or moldability, the upper limit is preferably 10,000 ppm or less, and more preferably 9,000 ppm or less.

From the viewpoint of the improvement of the fluidity and tensile strength of a thermoplastic resin, the weight of the compound represented by the formula (B) in the dihydroxy compound is preferably 200 ppm or more, based on the weight (100 parts by weight) of the dihydroxy compound represented by the formula (1). It may be, for example, 600 ppm or more, or 2,000 ppm or more. The upper limit is not particularly limited. Taking into consideration the point that the strength (e.g., impact strength) of a molded body is maintained upon the molding of the resin, the upper limit is preferably 5,000 ppm or less, and more preferably 4,000 ppm or less.

From the viewpoint of the improvement of the fluidity and tensile strength of a thermoplastic resin, the weight of the compound represented by the formula (C) in the dihydroxy compound is preferably 200 ppm or more, based on the weight (100 parts by weight) of the dihydroxy compound represented by the formula (1). It may be, for example, 500 ppm or more, or 800 ppm or more, or 1,000 ppm or more, or 3,000 ppm or more. The upper limit is not particularly limited. Taking into consideration the retention of heat resistance and/or moldability, the upper limit is preferably 5,000 ppm or less, and more preferably 4,000 ppm or less.

The amounts of the compound represented by the formula (A), the compound represented by the formula (B), and the compound represented by the formula (C), which are comprised in the dihydroxy compound, can be measured using a liquid chromatograph-mass spectrometer (LC-MS). An examples of conditions for the LC-MS measurement is the following (LC-MS measurement conditions).

LC: Waters Acquity UPLC
    Flow rate: 0.5 ml/min
    Temperature: 60° C.
    Detector: UV 254 nm
    Column: Waters BEH phenyl (2.1 mm in diameter×100 mm in length, particle diameter: 1.7 um)
    Eluent: A mixed solution of A: water and B: methanol was used.
    Changes in the mixing ratio over time are shown below.
    B=60%, (0-6 min)
    B=60%-95% (6-10 min)
    B=95%-100% (10-11 min)
    B=100% (11-12 min)
MS: Waters MALDI-Synapt HDMS
    Mode: MS
    Scanning range: 100-1500/0.3 sec
    Ionization method: ESI (+)
    Resolution: 8500 (V mode)
    Capillary voltage: 3 kV
    Code voltage: 30 V
    Trap collision energy: 5 V
    Transfer collision energy: 5 V
    Source temperature: 150° C.
    Desolvation temperature: 500° C.
    Amount injected: 2 μl
    Internal standard substance (mass correction): Leucine Enkephalin, 0.5 ng/ul
    Internal standard flow rate: 0.1 ml/min The method of setting the content of the compound represented by the formula (A), the compound represented by the formula (B) and the compound represented by the formula (C) in the dihydroxy compound to be a predetermined amount or more is not particularly limited. Examples of the method include: a method of adding the compound represented by the formula (A), the compound represented by the formula (B), and/or the compound represented by the formula (C) to the dihydroxy compound used as a raw material; a method of using a low-purity dihydroxy compound comprising predetermined amounts of the compound represented by the formula (A), the compound represented by the formula (B), and/or the compound represented by the formula (C); a method of regulating conditions for synthesizing the dihydroxy compound represented by the formula (1) (for example, the reaction temperature and the reaction time are set to be, for example, 100° C. to 140° C. and 1 to 30 hours, and for example, approximately 100° C. and approximately 11 hours); a method of regulating purification conditions after the synthesis of a compound (for example, the number of water washing is regulated (to, for example, 3 times or less, or two times or less), or the temperature of water used in the water washing is set at, for example, 40° C. to 90° C.); and a method of regulating the precipitation speed of crystals after completion of the reaction.

Hereafter, a thermoplastic resin obtained by the production method of the present invention will be described.

<Thermoplastic Resin>

A thermoplastic resin obtained by the production method according to the embodiment of the present invention is produced by reacting reactants comprising the dihydroxy compound represented by the formula (1). This thermoplastic resin comprises a constituting unit (1)' derived from the dihydroxy compound represented by the formula (1).

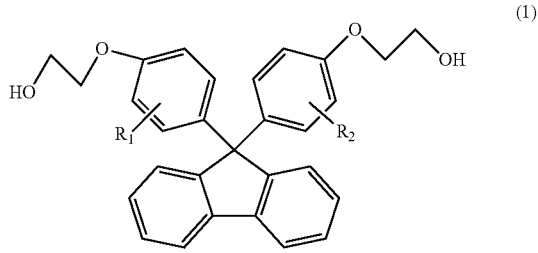

(1)

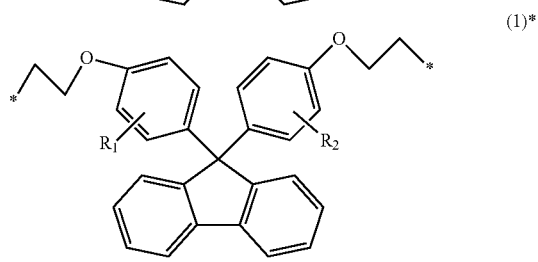

(1)*

In the above formula (1)', the symbol * represents a binding moiety.

A resin comprising the compound of the above formula (1) as a raw material exhibits physical properties such as a high refractive index, a low Abbe number, high transparency, a glass transition temperature suitable for injection molding, and low birefringence. By using this resin, optical components, such as excellent optical lens having substantially no optical distortion can be obtained.

As a thermoplastic resin used herein, a polyester resin, a polyester carbonate resin, or a polycarbonate resin is preferable. Among others, the thermoplastic resin preferably comprises a polycarbonate resin, since the polycarbonate resin is excellent in heat resistance and hydrolysis resistance. The thermoplastic resin may comprise the aforementioned resins, alone or in combination of two or more types.

Optical properties such as refractive index, Abbe number, and birefringence value are greatly influenced by the chemical structure of a constituting unit. On the other hand, whether the chemical bond between constituting units is an ester bond or a carbonate bond has a relatively small influence on such optical properties. Moreover, also regarding the influence of impurities (an increase in the saturated water absorption rate or a decrease in the polymerization rate), the influence of the chemical structure of a constituting unit that constitutes a resin is large, and the influence of a difference in the chemical bond (an ester bond or a carbonate bond) between constituting units is relatively small.

The thermoplastic resin according to the embodiment of the present invention is produced by reacting reactants comprising a dihydroxy compound. For example, the present thermoplastic resin is produced by performing polycondensation using, as a raw material, a dihydroxy compound comprising the dihydroxy compound represented by the formula (1). In the compound represented by the formula (1), the functional group contributing to polycondensation is an alcoholic hydroxyl group or a phenolic hydroxyl group. By reacting the compound represented by the formula (1) with a carbonic acid diester and/or a dicarboxylic acid or derivative of the dicarboxylic acid according to a polycondensation reaction, a constituting unit (1)' derived from the compound represented by the formula (1) is allowed to bind to a carbonic acid diester and/or a dicarboxylic acid or derivative of the dicarboxylic acid via a carbonate bond and/or an ester bond. By using the dihydroxy compound represented by the formula (1) as a raw material, a thermoplastic resin comprising the constituting unit (1)' derived from the dihydroxy compound represented by the formula (1) can be obtained.

In the formula (1), $R_1$ and $R_2$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, and an aryloxy group containing 6 to 20 carbon atoms. Among others, a compound, in which $R_1$ and $R_2$ each represent a hydrogen atom or an aryl group containing 6 to 20 carbon atoms (preferably, a phenyl group), is preferable, since melt fluidity becomes favorable when the compound is molded to obtain optical lens.

Examples of the compound represented by the formula (1) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and 9,9-bis(4-(2-hydroxyethoxy)-3-phenylphenyl)fluorene. Among these compounds, 9,9-bis(4-(2-hydroxyethoxy)-3-phenylphenyl)fluorene and 9,9-bis(4-(2-hydroxyethoxy)phenyl)fluorene are preferable, and 9,9-bis(4-(2-hydroxyethoxy)phenyl)fluorene is more preferable. These compounds may be used alone, or may also be used in combination of two or more types.

The percentage of the dihydroxy compound of the formula (1) is preferably 1 to 100 mol %, more preferably 30 to 100 mol %, and further preferably 40 to 100 mol %, based on 100 mol % of the dihydroxy compound used as a raw material for a thermoplastic resin. In addition, the percentage of the dihydroxy compound of the formula (1) is preferably 1 to 100 mol %, more preferably 30 to 100 mol %, and further preferably 40 to 100 mol %, based on 100 mol % of all monomers used as raw materials for a thermoplastic resin.

As mentioned above, the above-described dihydroxy compound comprises at least one of the compound represented by the formula (A), the compound represented by the formula (B), and the compound represented by the formula (C). In general, these compounds, together with the dihydroxy compound of the formula (1), are subjected to a polycondensation reaction, so that a constituting unit (A)' derived from the compound represented by the formula (A), a constituting unit (B)' derived from the compound represented by the formula (B), and a constituting unit (C)' derived from the compound represented by the formula (C) can be incorporated into the thermoplastic resin.

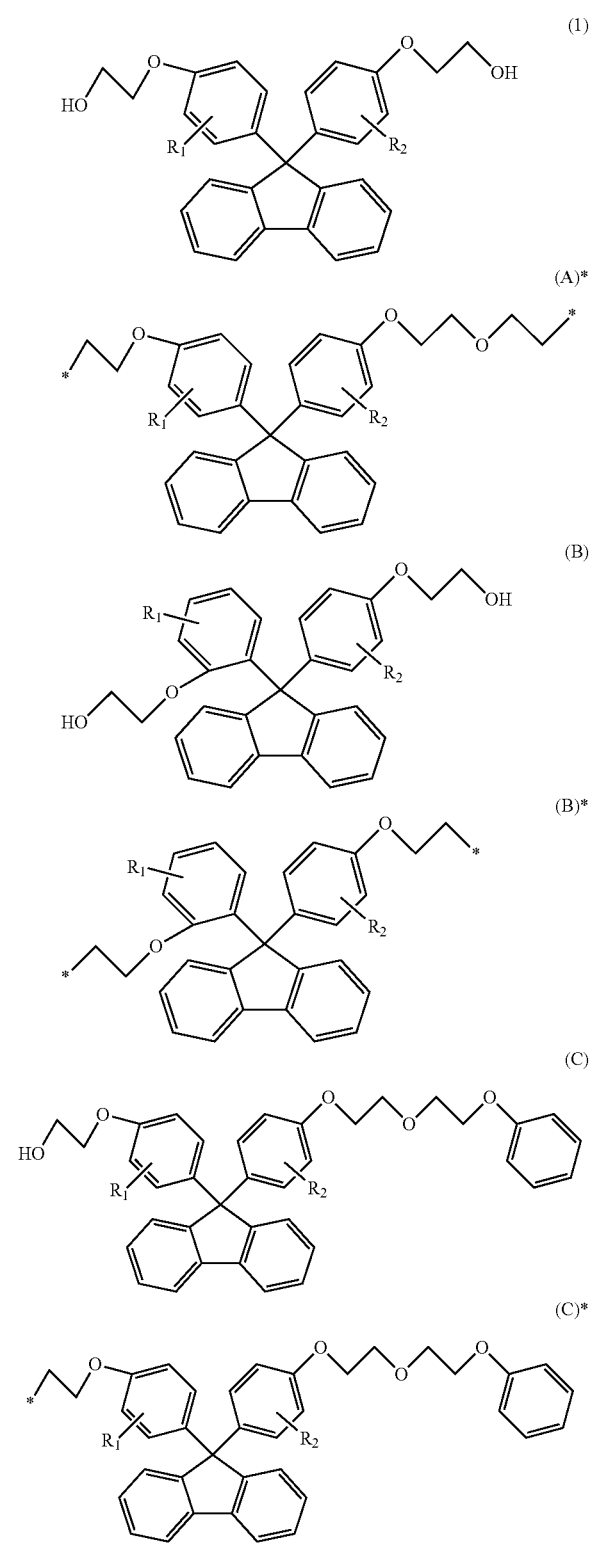

In the above formula (A)', (B)', or (C)', the symbol * represents a binding moiety.

In the above formulae (A) to (C), $R_1$ and $R_2$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, and an aryloxy group containing 6 to 20 carbon atoms. $R_1$ and $R_2$ in the formulae (A) to (C) are identical to $R_1$ and $R_2$ in the formula (1), respectively.

For example, a compound wherein $R_1$ and $R_2$ are hydrogen atoms in the formula (1) (9,9-bis(4-(2-hydroxyethoxy)phenyl)fluorene; BPEF; a compound represented by the following formula (1)-1, and the corresponding compounds represented by formulae (A)-1 to (C)-1 are as follows.

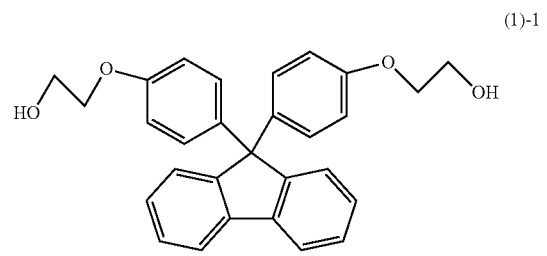
(1)-1

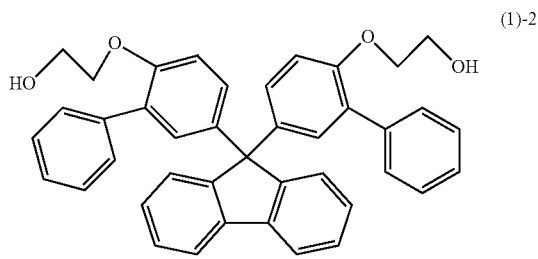
(1)-2

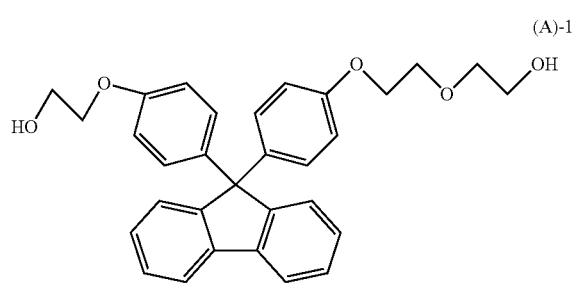
(A)-1

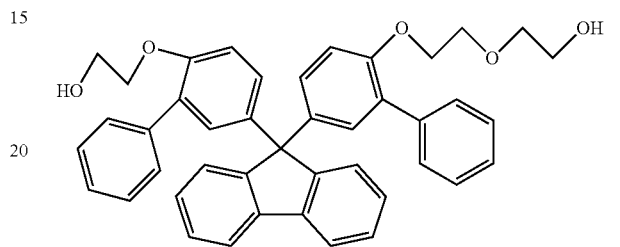
(A)-2

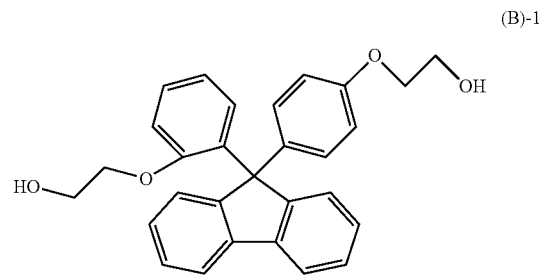
(B)-1

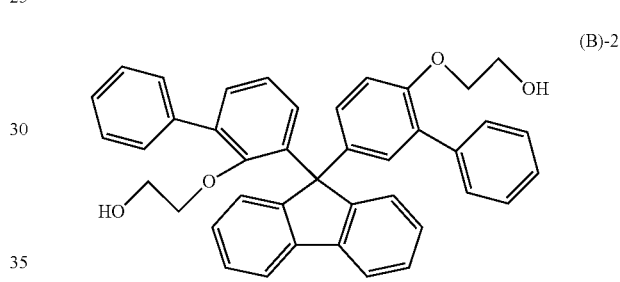
(B)-2

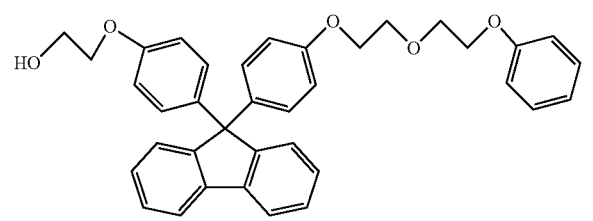
(C)-1

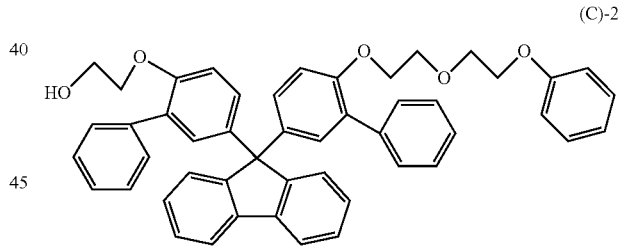
(C)-2

In addition, a compound wherein $R_1$ and $R_2$ are phenyl groups in the formula (1) (e.g., 9,9-bis(4-(2-hydroxyethoxy)-3-phenylphenyl)fluorene; BPPEF: a compound represented by the following formula (1)-2, and the corresponding compounds represented by formulae (A)-2 to (C)-2 are as follows.

(Other Dihydroxy Components)

In the present invention, as dihydroxy components, other dihydroxy compounds can be used in combination with the compound represented by the formula (1). For example, the dihydroxy compound further comprises at least one dihydroxy compound selected from the group consisting of the dihydroxy compound represented by the formula (2) and the dihydroxy compound represented by the formula (3), as well as the dihydroxy compound represented by the formula (1). Using such a dihydroxy compound as a raw material, the obtained thermoplastic resin further comprises at least one of a constituting unit (2)' derived from the dihydroxy compound represented by the formula (2) and a constituting unit (3)' derived from the dihydroxy compound represented by the formula (3), as well as a constituting unit (1)' derived from the dihydroxy compound represented by the formula (1).

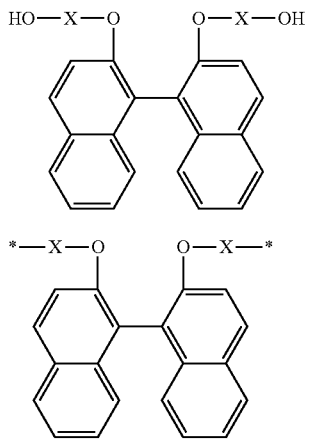

(2)

(2)*

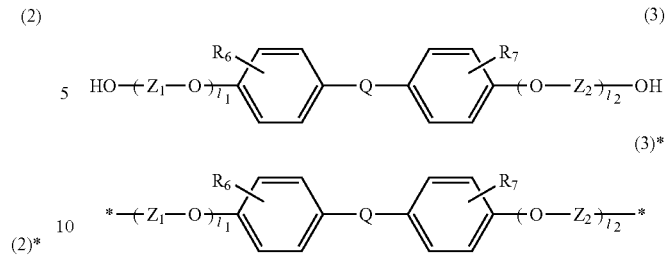

(3)

(3)* wherein, in the above formulae, the symbol * represents a binding moiety.

In the compound represented by the formula (2), the functional group contributing to polycondensation is an alcoholic hydroxyl group. The constituting unit (2)' derived from the compound represented by the formula (2) contributes to a high refractive index, and at the same time, it also contributes to a reduction in the Abbe number, rather than the constituting unit (1)' derived from the compound represented by the formula (1). By allowing the thermoplastic resin to comprise the constituting unit (1)' and the constituting unit (2)', the effect of reducing the birefringence value of the entire resin and reducing the optical distortion of an optical molded body can be obtained.

The total amount of the dihydroxy compound of the formula (1) and the dihydroxy compound of the formula (2) is preferably 50 mol % or more, more preferably 80 mol % or more, particularly preferably 90 mol % or more, and most preferably 100 mol %, based on 100 mol % of the dihydroxy compound used as a raw material for a thermoplastic resin. The molar ratio between the dihydroxy compound of the formula (1) and the dihydroxy compound of the formula (2) (the constituting unit (1)' and the constituting unit (2)') is preferably 20/80 to 80/20, more preferably 30/70 to 80/20, and particularly preferably 40/60 to 80/20.

In the formula (2), X each independently represents an alkylene group containing 1 to 4 carbon atoms. Preferred examples of such an alkylene group containing 1 to 4 carbon atoms include a methylene group, an ethylene group, a propylene group, an isopropylene group, an n-butylene group, an isobutylene group, a sec-butylene group, and a tert-butlene group. Among these groups, X is preferably always an ethylene group because the melt fluidity of a resin becomes favorable upon molding.

Examples of the dihydroxy compound represented by the formula (2) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene. Among these compounds, 2,2'-bis(2-hydroxyethoxy)-1,1'-binaphthalene is preferable. These compounds may be used alone, or may also be used in combination of two or more types.

By using such a dihydroxy compound as a raw material, the obtained thermoplastic resin has the constituting unit (2)' derived from the compound represented by the formula (2).

In the above formulae, the symbol * represents a binding moiety.

In the compound represented by the formula (3), the functional group contributing to polycondensation is an alcoholic hydroxyl group or a phenolic hydroxyl group. The constituting unit (3)' derived from the compound represented by the formula (3) contributes to a high refractive index, and at the same time, it also contributes to a reduction in the Abbe number, rather than the constituting unit (A) derived from the compound represented by the formula (1). By allowing the thermoplastic resin to comprise the constituting unit (A) and the constituting unit (C), the effect of reducing the birefringence value of the entire resin and reducing the optical distortion of an optical molded body can be obtained.

The total amount of the dihydroxy compound of the formula (1) and the dihydroxy compound of the formula (3) is preferably 50 mol % or more, more preferably 80 mol % or more, particularly preferably 90 mol % or more, and most preferably 100 mol %, based on 100 mol % of the dihydroxy compound used as a raw material for a thermoplastic resin. The molar ratio between the dihydroxy compound of the formula (1) and the dihydroxy compound of the formula (3) (the constituting unit (1)' and the constituting unit (3)') is preferably 20/80 to 99/1, more preferably 30/70 to 95/5, and particularly preferably 40/60 to 90/10.

In the formula (3), $R_6$ and $R_7$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, an aryloxy group containing 6 to 20 carbon atoms, and a halogen atom (F, Cl, Br, or I). Among others, a hydrogen atom and a methyl group are preferable, since this compound causes small amounts of impurities and is distributed in a large amount.

In the formula (3), $Z_1$ and $Z_2$ are each independently selected from the group consisting of an alkylene group containing 1 to 8 carbon atoms, a cycloalkylene group containing 6 to 10 carbon atoms, and an arylene group containing 6 to 10 carbon atoms. Among others, a cycloalkylene group containing 6 carbon atoms and an arylene group containing 6 carbon atoms are preferable because these are excellent in heat resistance.

In the formula (3), $l_1$ and $l_2$ each independently represent an integer of 0 to 5. Among others, $l_1$ and $l_2$ are 0, because of excellent heat resistance.

In the formula (3), Q is a single bond or is selected from the group consisting of:

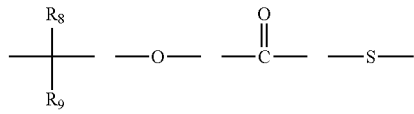

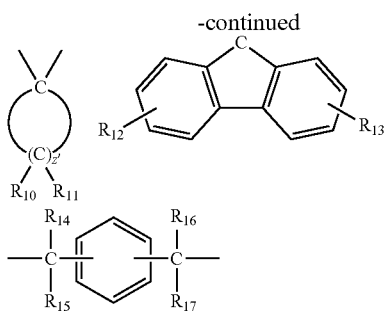

wherein $R_8$, $R_9$, and $R_{14}$ to $R_{17}$ are each independently selected from the group consisting of a hydrogen atom, an alkyl group containing 1 to 10 carbon atoms, and a phenyl group;

$R_{10}$ to $R_{13}$ each independently represent a hydrogen atom or an alkyl group containing 1 to 5 carbon atoms;

Z' represents an integer of 3 to 11; and $R_6$ and $R_7$ may be the same or different from each other.

Among others, because of excellent heat resistance, it is preferable that $l_1$ and $l_2$ in the above formula (3) be 0, and that Q be the following:

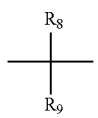

wherein $R_8$ and $R_9$ are as defined in the above formula (3).

Examples of the dihydroxy compound represented by the formula (3) include 4,4-bis(4-hydroxyphenyl)propane (i.e., bisphenol A), 1,1-bis(4-hydroxyphenyl)-1-phenylethane (i.e., bisphenol AP), 2,2-bis(4-hydroxyphenyl)hexafluoropropane (i.e., bisphenol AF), 2,2-bis(4-hydroxyphenyl)butane (i.e., bisphenol B), bis(4-hydroxyphenyl)diphenylmethane (i.e., bisphenol BP), bis(4-hydroxy-3-methylphenyl)propane (i.e., bisphenol C), 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 1,1-bis(4-hydroxyphenyl)ethane (i.e., bisphenol E), bis(4-hydroxyphenyl)methane (i.e., bisphenol F), 2,4'-dihydroxy-diphenylmethane, bis(2-hydroxyphenyl)methane, 2,2-bis(4-hydroxy-3-isopropylphenyl)propane (i.e., bisphenol G), 1,3-bis(2-(4-hydroxyphenyl)-2-propyl)benzene (i.e., bisphenol M), bis(4-hydroxyphenyl)sulfone (i.e., bisphenol S), 2,4'-dihydroxydiphenylsulfone, bis(4-hydroxyphenyl)sulfide, 1,4-bis(2-(4-hydroxyphenyl)-2-propyl)benzene (i.e., bisphenol P), bis(4-hydroxy-3-phenylphenyl)propane (i.e., bisphenol PH), 1,1-bis(4-hydroxyphenyl)-3,3,5-trimethylcyclohexane (i.e., bisphenol TMC), 1,1-bis(4-hydroxyphenyl)cyclohexane (i.e., bisphenol Z), 1,1-bis(4-hydroxy-3-methylphenyl)cyclohexane (i.e., bisphenol OCZ), 3,3-bis(4-hydroxyphenyl)pentane, 4,4-biphenol, 9,9-bis(4-(2-hydroxyethoxy)phenyl)fluorene, 9,9-bis(4-hydroxy-2-methylphenyl)fluorene, 9,9-bis(4-hydroxyphenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 2,2-bis(4-hydroxyphenyl)pentane, 4,4'-dihydroxydiphenyl ether, and 4,4'-dihydroxy-3,3'-dichlorodiphenyl ether. The dihydroxy compound represented by the formula (3) is particularly preferably bisphenol A, since bisphenol A is available at a low cost as a good monomer, which has versatility, does not comprise impurities such as metal contents, and is excellent in heat resistance.

By using such a dihydroxy compound as a raw material, the obtained thermoplastic resin has the constituting unit (3)' derived from the compound represented by the formula (3).

<Other Dihydroxy Components>

The thermoplastic resin may comprise constituting units derived from dihydroxy compounds other than the above-described compounds of the formulae (1) to (3). Examples of such other dihydroxy compounds include: alicyclic dihydroxy compounds such as tricyclodecane[$5.2.1.0^{2,6}$]dimethanol, pentacyclopentadecane dimethanol, cyclohexane-1,2-dimethanol, cyclohexane-1,4-dimethanol, cyclohexane-1,3-dimethanol, decaline-2,6-dimethanol, decaline-2,3-dimethanol, decaline-1,5-dimethanol, 2,3-norbornane dimethanol, 2,5-norbornane dimethanol, or 1,3-adamantane dimethanol; and aliphatic dihydroxy compounds such as ethylene glycol, 1,3-propanediol, 1,2-propanediol, 1,4-butanediol, 1,3-butanediol, 1,2-butanediol, 1,5-pentanediol, 1,6-hexanediol, 1,5-heptanediol, 1,8-octanediol, 1,9-nonanediol, 1,10-decanediol, or spiroglycol.

Other dihydroxy compounds are added in an amount of desirably 20 mol % or less, and more desirably 10 mol % or less, based on 100 mol % of the compound of the formula (1). If the amount of other hydroxyl compounds is in this range, a high refractive index can be retained.

In order to maintain optical distortion at a low level, the thermoplastic resin is preferably a resin consisting of the constituting unit (1)' derived from the dihydroxy compound of the formula (1) (first aspect); a resin consisting of the constituting unit (1)' derived from the dihydroxy compound of the formula (1) and the constituting unit (2)' derived from the dihydroxy compound of the formula (2) (second aspect); a resin consisting of the constituting unit (1)' derived from the dihydroxy compound of the formula (1) and the constituting unit (3)' derived from the dihydroxy compound of the formula (3) (third aspect); a resin consisting of the constituting unit (1)' derived from the dihydroxy compound of the formula (1), the constituting unit (2)' derived from the dihydroxy compound of the formula (2), and the constituting unit (3)' derived from the dihydroxy compound of the formula (3) (fourth aspect); or a resin consisting of the constituting unit (1)' derived from the dihydroxy compound of the formula (1), and at least one dicarboxylic acid selected from dimethyl terephthalate and dimethyl 2,6-naphthalenedicarboxylate, or a derivative thereof (fifth aspect). The thermoplastic resins of the first aspect to the fifth aspect (polycarbonate resin, polyester resin, and polyester carbonate resin) may be used by being mixed with one another, or can also be used by being mixed with other resins. The phrase "a resin consisting of the constituting unit (1)' and any given constituting unit α (α=(2)' and/or (3)')" means that the repeating units in the resin, other than a carbonate bond moiety and an ester bond moiety, consist of the constituting unit (1)' and any given constituting unit α (α=(2)' and/or (3)'). Besides, the polycarbonate bond moiety is derived from a carbonate precursor substance such as phosgene or carbonic acid diester.

The thermoplastic resins of the first aspect to the fifth aspect may comprise, as a trace component, at least one of the constituting unit (A)' derived from the dihydroxy compound of the formula (A), the constituting unit (B)' derived from the dihydroxy compound of the formula (B), and the constituting unit (C)' derived from the dihydroxy compound of the formula (C).

In a preferred embodiment, the thermoplastic resins of the first aspect to the fourth aspect are polycarbonate resins.

In a preferred embodiment, the thermoplastic resin of the fifth aspect is a polyester carbonate resin.

The weight average molecular weight of the thermoplastic resin is preferably 10,000 to 100,000. The weight average molecular weight (Mw) of the thermoplastic resin means a weight average molecular weight in terms of styrene, and it is measured by the method described in the after-mentioned Examples. If Mw is 10,000 or more, the brittleness reduction of the molded body is prevented. If Mw is 100,000 or less, melt viscosity does not become too high, and thus, it is easy to remove the resin from a metallic mold upon molding. Moreover, good fluidity is achieved, and it is preferable for injection molding in a melted state. The weight average molecular weight (Mw) is more preferably 20,000 to 70,000, and further preferably 25,000 to 60,000.

When the thermoplastic resin is used in injection molding, the glass transition temperature (Tg) is preferably 95° C. to 180° C., more preferably 110° C. to 170° C., further preferably 115° C. to 160° C., particularly preferably 125° C. to 145° C. If Tg is lower than 95° C., the range of the used temperature is unfavorably narrowed. On the other hand, if Tg exceeds 180° C., the melting temperature of the resin becomes high, and the decomposition or coloration of the resin is unfavorably easily generated. Moreover, when the glass transition temperature of the resin is too high, a different between the metallic mold temperature and the glass transition temperature of the resin becomes large, if a commonly used metallic mold temperature controller is used. Hence, in the intended use for which products are required to have high profile irregularity, it is difficult and thus unfavorable to use a resin having an extremely high glass transition temperature.

As an indicator of heat stability for enduring heating upon the injection molding of the thermoplastic resin, the 5% weight loss temperature (Td), which is measured at a temperature-increasing rate of 10° C./min, is preferably 350° C. or higher. When the 5% weight loss temperature is lower than 350° C., thermal decomposition significantly takes place upon molding, and thus, it unfavorably becomes difficult to obtain a good molded body.

The thermoplastic resin may have any structure of random, block, and alternating copolymers.

In the thermoplastic resin, phenol generated upon the production thereof or unreacted remaining carbonic acid diester is present as an impurity. The content of such phenol in the thermoplastic resin is preferably 0.1 to 3000 ppm, more preferably 0.1 to 2000 ppm, and particularly preferably 1 to 1000 ppm, 1 to 800 ppm, 1 to 500 ppm, or 1 to 300 ppm. In addition, the content of such carbonic acid diester in a polycarbonate resin or a polyester carbonate resin is preferably 0.1 to 1000 ppm, more preferably 0.1 to 500 ppm, and particularly preferably 1 to 100 ppm. By controlling the amounts of phenol and carbonic acid diester contained in the resin, a resin having physical properties depending on purpose can be obtained. The contents of phenol and carbonic acid diester can be controlled, as appropriate, by changing conditions or devices for polycondensation. Moreover, such contents can also be controlled by changing conditions applied in an extrusion step following polycondensation.

If the content of phenol or carbonic acid diester is higher than the above-described range, there may be a case where problems occur, such as a reduction in the strength of the obtained resin molded body or generation of odor. In contrast, if the content of phenol or carbonic acid diester is lower than the above-described range, there may be a case where plasticity is reduced upon the melting of the resin.

The thermoplastic resin according to the embodiment desirably comprises foreign matters in extremely small amounts, and thus, it is preferable to carry out filtration of melted raw materials, filtration of a catalyst solution, and filtration of melted oligomers. The mesh size of a filter is preferably 7 µm or less, and more preferably 5 µm or less. Moreover, it is also preferable to filtrate the generated resin through a polymer filter. The mesh size of a polymer filter is preferably 100 µm or less, and more preferably 30 µm or less. Furthermore, a step of collecting resin pellets must be naturally carried out under a low-dust environment, and the class is preferably 6 or less, and more preferably 5 or less.

Hereafter, a polycarbonate resin and a polyester carbonate resin will be exemplified and explained as thermoplastic resins. A polyester resin can also be carried out with reference to the description of the following (Polycarbonate resin), and/or by applying a publicly known method.

(Polycarbonate Resin)

The polycarbonate resin according to the embodiment is a polycarbonate resin comprising the constituting unit (1)' derived from the compound represented by the formula (1), and as a trace component, at least one of the constituting unit (A)' derived from the dihydroxy compound of the formula (A), the constituting unit (B)' derived from the dihydroxy compound of the formula (B), and the constituting unit (C)' derived from the dihydroxy compound of the formula (C), and as necessary, the aforementioned other constituting units (e.g., the constituting units (2)' and/or (3)', etc.). For example, the polycarbonate bond moiety is derived from a carbonate precursor substance such as phosgene or carbonic acid diester.

The polycarbonate resin is generated by allowing a dihydroxy compound to react with a carbonate precursor substance such as carbonic acid diester, and each constituting unit binds thereto via a carbonate bond. In one embodiment, reactants further comprise carbonic acid diester, as well as a dihydroxy compound.

Specifically, a dihydroxy compound comprising the compound represented by the above formula (1), at least one of the dihydroxy compound of the above formula (A), the dihydroxy compound of the above formula (B) and the dihydroxy compound of the above formula (C) used as a trace component, optionally, the compound(s) represented by the above formulae (2) and/or (3), and a carbonate precursor substance such as carbonic acid diester are allowed to react with one another in the presence of a transesterification catalyst or in the absence of a catalyst, so as to produce a polycarbonate resin. Examples of the reaction method include various methods including melt polycondensation methods such as a transesterification method or a direct polymerization method, a solution polymerization method, and an interfacial polymerization method. Among these methods, a melt polycondensation method that does not use a reaction solvent is preferable.

Examples of the carbonic acid diester include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these compounds, diphenyl carbonate is particularly preferable. The carbonic acid diester (e.g., diphenyl carbonate) is used at a ratio of preferably 0.97 to 1.20 moles, and more preferably 0.98 to 1.10 moles, based on total 1 mole of the dihydroxy compound.

An example of the production method is a method comprising stirring dihydroxy compound components and carbonic acid diester to melt them under an inert gas atmosphere, while heating, and then polymerizing them, while distilling away the generated alcohols or phenols. The reaction temperature is different depending on the boiling point of the generated alcohols or phenols, etc., but it is generally in the range from 120° C. to 350° C. From the initial stage of the reaction, the pressure is reduced, and the reaction is then terminated while distilling away the generated alcohols or phenols. Moreover, in order to promote the reaction, a transesterification catalyst can also be used. The reaction may be carried out in a continuous system or in a batch system. The reactor used upon performing the reaction may be a vertical reactor equipped with an anchor impeller, a MAXBLEND impeller, a helical ribbon impeller, etc., or a horizontal reactor equipped with a paddle blade, a lattice blade, a spectacle blade etc., or an extruder-type reactor equipped with a screw. Furthermore, taking into consideration the viscosity of a polymer, a reactor, in which the aforementioned reactors are appropriately combined with one another, can preferably be used.

As such a transesterification catalyst, a basic compound catalyst is used. Examples of such a basic compound catalyst include an alkaline metal compound, an alkaline-earth metal compound, and a nitrogen-containing compound.

Examples of the alkaline metal compound include the organic acid salt, inorganic acid salt, oxide, hydroxide, hydride, or alkoxide of alkaline metals. Specific examples of the alkaline metal compound used herein include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, the disodium salt, dipotassium salt, dicesium salt or dilithium salt of bisphenol A. and the sodium salt, potassium salt, cesium salt or lithium salt of phenol.

Examples of the alkaline-earth metal compound include the organic acid salt, inorganic acid salt, oxide, hydroxide, hydride, or alkoxide of an alkaline-earth metal compound. Specific examples of the alkaline-earth metal compound used herein include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenyl phosphate.

Examples of the nitrogen-containing compound include quaternary ammonium hydroxide and a salt thereof, and amines. Specific examples of the nitrogen-containing compound used herein include: quaternary ammonium hydroxides having an alkyl group, an aryl group, etc., such as tetramethylammonium hydroxide, tetraethylammonium hydroxide, tetrapropylammonium hydroxide, tetrabutylammonium hydroxide, or trimethylbenzylammonium hydroxide; tertiary amines, such as triethylamine, dimethylbenzylamine, or triphenylamine; secondary amines, such as diethylamine or dibutylamine; primary amines, such as propylamine or butylamine; imidazoles, such as 2-methylimidazole, 2-phenylimidazole, or benzimidazole; and bases or basic salts, such as ammonia, tetramethylammonium borohydride, tetrabutylammonium borohydride, tetrabutylammonium tetraphenylborate, or tetraphenylammonium tetraphenylborate.

As other transesterification catalysts, the salts of zinc, tin, zirconium, lead, etc. may also be used. These salts can be used alone or in combination.

Specific examples of other transesterification catalysts include zinc acetate, zinc benzoate, zinc 2-ethylhexanoate, tin(II) chloride, tin(IV) chloride, tin(II) acetate, tin(IV) acetate, dibutyltin laurate, dibutyltin oxide, dibutyltin dimethoxide, zirconium acetylacetonate, zirconium oxyacetate, zirconium tetrabutoxide, lead(II) acetate, and lead(IV) acetate.

The transesterification catalyst is used at a ratio of $1 \times 10^{-9}$ to $\times 10^{-3}$ moles, and preferably $1 \times 10^{-7}$ to $1 \times 10^{-4}$ moles, based on total 1 mole of the dihydroxy compound.

The catalysts may be used in combination of two or more types. In addition, the catalyst itself may be directly added to the reactants, or may be dissolved in a solvent such as water or phenol and may be then added to the reactants.

In the melt polycondensation method, melt polycondensation is carried out using the above-described raw materials and catalysts, under heating, and further, under an ordinary or reduced pressure, while by-products are removed by a transesterification reaction. The catalyst may be added together with raw materials at the initial stage of the reaction, or may be added in the course of the reaction.

In the method for producing a thermoplastic resin of the present invention, in order to retain heat stability and hydrolytic stability, the catalyst may be removed or deactivated after completion of the polymerization reaction. However, the catalyst is not necessarily deactivated. In the case of deactivating the catalyst, a method for deactivating a catalyst by addition of a known acidic substance can be preferably carried out. Specific examples of such an acidic substance, which can be preferably used herein, include: esters such as butyl benzoate; aromatic sulfonic acids such as p-toluenesulfonic acid; aromatic sulfonic acid esters such as butyl p-toluenesulfonate or hexyl p-toluenesulfonate; phosphoric acids such as phosphorous acid, phosphoric acid, or phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite, or monooctyl phosphite; phosphoric acid esters such as triphenyl phosphate, diphenyl phosphate, monophenyl phosphate, dibutyl phosphate, dioctyl phosphate, or monooctyl phosphate: phosphonic acids such as diphenyl phosphonate, dioctyl phosphonate, or dibutyl phosphonate: phosphonic acid esters such as diethyl phenylphosphonate: phosphines such as triphenylphosphine or bis(diphenylphosphino)ethane: boric acids such as boric acid or phenylbonic acid; aromatic sulfonates such as tetrabutylphosphonium dodecylbenzenesulfonate: organic halides such as stearoyl chloride, benzoyl chloride, or p-toluenesulfonyl chloride; alkyl sulfates such as dimethyl sulfate; and organic halides such as benzyl chloride. From the viewpoint of the effects of the deactivator, the stability to the resin, etc., p-toluene or butyl sulfonate is particularly preferable. The deactivator is used in a molar amount that is 0.01 to 50 times, and preferably 0.3 to 20 times higher than the amount of the catalyst. If the molar amount of the deactivator is smaller than 0.01 time the molar amount of the catalyst, deactivation effects unfavorably become insufficient. On the other hand, if the molar amount of the deactivator is larger than 50 times the molar amount of the catalyst, the heat resistance of the resin is reduced, and the obtained molded body is unfavorably easily colored.

The deactivator may be kneaded immediately after completion of the polymerization reaction. Otherwise, the deactivator may also be kneaded, after the resin has been pelletized after completion of the polymerization. Moreover, in addition to the deactivator, other additives (e.g., the after-mentioned antioxidant, release agent, ultraviolet absorber, fluidity modifier, crystal nucleating agent, reinforcer, dye, antistatic agent, antibacterial agent, etc.) can also be added by the same method as described above.

After deactivation of the catalyst (after completion of the polymerization reaction, when the activator is not added), it may be appropriate to establish a step of devolatizing and removing low-boiling-point compounds from the polymer under a pressure of 0.1 to 1 mmHg and at a temperature of 200° C. to 350° C. The temperature applied upon such devolatilization and removal is preferably 230° C. to 300° C., and more preferably 250° C. to 270° C. In this step, a horizontal device equipped with an impeller having excellent surface renewal capacity, such as a paddle blade, a lattice blade or a spectacle blade, or a thin-film evaporator is preferably used.

(Polyester Carbonate Resin)

In the polyester carbonate resin according to the embodiment, the constituting unit (1)' derived from the compound represented by the formula (1); at least one of the constituting unit (A)' derived from the dihydroxy compound of the formula (A), the constituting unit (B)' derived from the dihydroxy compound of the formula (B), and the constituting unit (C)' derived from the dihydroxy compound of the formula (C), which is used as a trace component; a constituting unit derived from dicarboxylic acid or derivative of the dicarboxylic acid; and as necessary, the aforementioned other constituting units, are allowed to bind to one another via a carbonate bond and an ester bond.

In one embodiment, the polyester carbonate resin is generated by allowing a dihydroxy compound, dicarboxylic acid or derivative of the dicarboxylic acid, and a carbonate precursor substance such as carbonic acid diester to react with one another. Accordingly, in one embodiment, reactants comprise the compound represented by the above formula (1); at least one of the hydroxyl compound of the above formula (A), the hydroxyl compound of the above formula (B), and the hydroxyl compound of the above formula (C), which is used as a trace component; optionally, a dihydroxy compound comprising the compound(s) represented by the above formulae (2) and/or (3); dicarboxylic acid or derivative of the dicarboxylic acid; and a carbonate precursor substance.

Specifically, the compound represented by the general formula (1), at least one of the dihydroxy compound of the above formula (A), the dihydroxy compound of the above formula (B) and the dihydroxy compound of the above formula (C) used as a trace component, optionally, the compound(s) represented by the above formulae (2) and/or (3), dicarboxylic acid or derivative of the dicarboxylic acid (dicarboxylic acid component), and a carbonic acid diester are allowed to react with one another in the presence of a transesterification catalyst or in the absence of a catalyst, so as to produce a polyester carbonate resin. Examples of the reaction method include various methods including melt polycondensation methods such as a transesterification method or a direct polymerization method, a solution polymerization method, and an interfacial polymerization method. Among these methods, a melt polycondensation method that does not use a reaction solvent is preferable.

The dicarboxylic acid component is not particularly limited. Preferred examples of the dicarboxylic acid component include: aromatic dicarboxylic acids, such as naphthalenedicarboxylic acid (e.g., 2,7-naphthalenedicarboxylic acid, 2,6-naphthalenedicarboxylic acid, 2,3-naphthalenedicarboxylic acid, 1,8-naphthalenedicarboxylic acid, and 1,4-naphthalenedicarboxylic acid), terephthalic acid, isophthalic acid, phthalic acid, 2-methylterephthalic acid, biphenyldicarboxylic acid, tetralindicarboxylic acid, or fluorene-9,9-dipropionic acid; fatty acid dicarboxylic acids, such as oxalic acid, malonic acid, succinic acid, maleic acid, fumaric acid, glutaric acid, adipic acid, pimelic acid, suberic acid, azelaic acid, sebacic acid, decanedicarboxylic acid, dodecanedicarboxylic acid, cyclohexanedicarboxylic acid, decalinedicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, or dimer acid; and derivatives thereof. These dicarboxylic acid components may be used alone or in combination of two or more types. Examples of the derivative of such dicarboxylic acid include esters (e.g., $C_{1-4}$ alkyl ester), acid anhydrides, and acid halides.

From the viewpoint of distribution on the market, heat resistance, and refractive index, among the aforementioned components, dicarboxylic acid comprising at least one selected from terephthalic acid, 2,6-naphthalenedicarboxylic acid and fluorene-9,9-dipropionic acid, or a derivative thereof is preferable; at least one selected from dimethyl terephthalate, dimethyl 2,6-naphthalenedicarboxylate and dimethyl fluorene-9,9-dipropionate is more preferable; and at least one selected from dimethyl 2,6-naphthalenedicarboxylate and dimethyl terephthalate is further preferable. The structure of dimethyl fluorene-9,9-dipropionate is shown below.

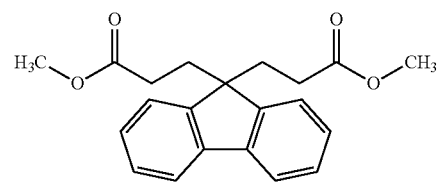

In a preferred embodiment, the total amount of dimethyl terephthalate, dimethyl 2,6-naphthalenedicarboxylate and dimethyl fluorene-9,9-dipropionate is preferably 80 mol % or more, more preferably 90 mol % or more, and further preferably 95 mol % or more, based on 100 mol % of the dicarboxylic acid component.

The molar ratio of the total of dihydroxy compounds to the total of dicarboxylic acid components (dicarboxylic acid or derivative of the dicarboxylic acid) is preferably 20/80 to 95/5, more preferably 50/50 to 90/20, and particularly preferably 60/40 to 85/15. In such a case, there can be obtained a resin comprising the constituting units derived from the dihydroxy compounds and the constituting units derived from the dicarboxylic acid at the aforementioned ratio.

Examples of the carbonic acid diester include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these compounds, diphenyl carbonate is particularly preferable. The carbonic acid diester (e.g., diphenyl carbonate) is used, preferably at a ratio of 0.97 to 1.20 moles, and more preferably at a ratio of 0.98 to 1.10 moles, based on total 1 mole of the dihydroxy compound.

As such a transesterification catalyst, a basic compound catalyst is used. Examples of such a basic compound catalyst include an alkaline metal compound, an alkaline-earth metal compound, and a nitrogen-containing compound.

Examples of the alkaline metal compound include the organic acid salt, inorganic acid salt, oxide, hydroxide, hydride, or alkoxide of alkaline metals. Specific examples of the alkaline metal compound used herein include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, the disodium salt, dipotassium salt, dicesium salt or dilithium salt of bisphenol A, and the sodium salt, potassium salt, cesium salt or lithium salt of phenol.

Examples of the alkaline-earth metal compound include the organic acid salt, inorganic acid salt, oxide, hydroxide, hydride, or alkoxide of an alkaline-earth metal compound. Specific examples of the alkaline-earth metal compound used herein include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenyl phosphate.

Examples of the nitrogen-containing compound include quaternary ammonium hydroxide and a salt thereof, and amines. Specific examples of the nitrogen-containing compound used herein include: quaternary ammonium hydroxides having an alkyl group, an aryl group, etc., such as tetramethylammonium hydroxide, tetraethylammonium hydroxide, tetrapropylammonium hydroxide, tetrabutylammonium hydroxide, or trimethylbenzylammonium hydroxide; tertiary amines, such as triethylamine, dimethylbenzylamine, or triphenylamine; secondary amines, such as diethylamine or dibutylamine; primary amines, such as propylamine or butylamine; imidazoles, such as 2-methylimidazole, 2-phenylimidazole, or benzimidazole; and bases or basic salts, such as ammonia, tetramethylammonium borohydride, tetrabutylammonium borohydride, tetrabutylammonium tetraphenylborate, or tetraphenylammonium tetraphenylborate.

As other transesterification catalysts, the salts of zinc, tin, zirconium, lead, titanium, germanium, antimony, osmium, aluminum, etc. may also be used. These salts can be used alone or in combination.

Specific examples of other transesterification catalysts include zinc acetate, zinc benzoate, zinc 2-ethylhexanoate, tin(II) chloride, tin(IV) chloride, tin(II) acetate, tin(IV) acetate, dibutyltin laurate, dibutyltin oxide, dibutyltin dimethoxide, zirconium acetylacetonate, zirconium oxyacetate, zirconium tetrabutoxide, lead(II) acetate, lead(IV) acetate, titanium(IV) tetrabutoxide, titanium(IV) tetraisopropoxide, titanium(IV)=tetrakis(2-ethyl-1-hexanolate), titanium(IV) oxide, and tris(2,4-pentadionato)aluminum (III).

The transesterification catalyst is used at a ratio of $1 \times 10^{-9}$ to $\times 10^{-3}$ moles, and preferably $1 \times 10^{-7}$ to $1 \times 10^{-4}$ moles, based on total 1 mole of the dihydroxy compound.

The catalysts may be used in combination of two or more types. Among others, titanium salts, such as titanium(IV) tetrabutoxide, titanium(IV) tetraisopropoxide, titanium(IV) =tetrakis(2-ethyl-1-hexanolate), or titanium(IV) oxide, are preferably used.

In addition, the catalyst itself may be directly added to the reactants, or may be dissolved in a solvent such as water or phenol and may be then added to the reactants.

In the melt polycondensation method, melt polycondensation is carried out using the above-described raw materials and catalysts, under heating, and further, under an ordinary or reduced pressure, while by-products are removed by a transesterification reaction. Specifically, it is preferable that the reaction temperature be set at ordinary temperature, and the reaction be initiated under ordinary pressure, and that the temperature be gradually increased and the pressure be gradually converted to reduced pressure, while by-products are removed. The catalyst may be added together with raw materials at the initial stage of the reaction, or may be added in the course of the reaction.

In order to retain heat stability and hydrolytic stability, the catalyst may be removed or deactivated after completion of the polymerization reaction. However, the catalyst is not necessarily deactivated. In the case of deactivating the catalyst, the same method as that described in the production of the polycarbonate resin can be preferably used.

(Other Additive Components)

To the thermoplastic resin, additives such as an antioxidant, a processing stabilizer, a light stabilizer, a polymerization metal inactivating agent, a fire retardant, a lubricant, an antistatic agent, a surfactant, an antibacterial agent, a release agent, an ultraviolet absorber, a plasticizer, and a compatibilizer may be added, in the range in which they do not impair the characteristics of the present invention.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis [3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphphosphonate-diethyl ester, tris(3,5-di-tert-butyl-4-hydroxybenzyl)isocyanurate, and 3,9-bis {1,1-dimethyl-2-[β-(3-tert-butyl-4-hydroxy-5-methylphenyl) propionyloxy]ethyl}-2,4,8,10-tetraoxaspiro(5,5)undecane. The content of the antioxidant is preferably 0.001 to 0.3 parts by weight based on 100 parts by weight of the thermoplastic resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid, and esters thereof. Specific examples include triphenyl phosphite, tris (nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-dicumylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite, and bis(2,4-di-tert-butylphenyl)-3-phenyl-phenyl phosphonite. The content of the phosphorus-based processing heat stabilizer is preferably 0.001 to 0.2 parts by weight based on 100 parts by weight of the thermoplastic resin.

Examples of the sulfur-based processing heat stabilizer include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, and distearyl-3,3'-thiodipropionate. The content of the sulfur-based processing heat stabilizer is preferably 0.001 to 0.2 parts by weight based on 100 parts by weight of the thermoplastic resin.

A preferred release agent is a release agent, 90% by weight or more of which consists of esters of alcohol and fatty acid. Specific examples of such esters of alcohol and fatty acid include esters of monohydric alcohol and fatty acid, and partial esters or total esters of polyhydric alcohol and fatty acid. The above-described esters of monohydric alcohol and fatty acid are preferably esters of monohydric alcohol containing 1 to 20 carbon atoms and saturated fatty acid containing 10 to 30 carbon atoms. Moreover, the above-described partial esters or total esters of polyhydric alcohol and fatty acid are preferably partial esters or total esters of polyhydric alcohol containing 1 to 25 carbon atoms and saturated fatty acid containing 10 to 30 carbon atoms. Specific examples of the esters of monohydric alcohol and saturated fatty acid include stearyl stearate, palmityl palmitate, butyl stearate, methyl laurate, and isopropyl palmitate. Specific examples of the partial esters or total esters of polyhydric alcohol and saturated fatty acid include total esters or partial esters of dipentaerythritol, such as monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate, or dipentaerythritol hexastearate. Among these compounds, monoglyceride stearate and monoglyceride laurate are particularly preferable. The content of such a release agent is preferably in the range of 0.005 to 2.0 parts by weight, more preferably in the range of 0.01 to 0.6 parts by weight, and further preferably in the range of 0.02 to 0.5 parts by weight, based on 100 parts by weight of the thermoplastic resin.

A preferred ultraviolet absorber is at least one ultraviolet absorber selected from the group consisting of a benzotriazole-based ultraviolet absorber, a benzophenone-based ultraviolet absorber, a triazine-based ultraviolet absorber, a cyclic imino ester-based ultraviolet absorber and a cyanoacrylate-based ultraviolet absorber. That is to say, the following ultraviolet absorbers may be used alone or in combination of two or more types.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimidemethyl)-5-methylphenyl]benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydridate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

Examples of the cyclic imino ester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and further preferably 0.05 to 0.8 parts by weight, based on 100 parts by weight of the thermoplastic resin. If the ultraviolet absorber is used in such a mixed amount, it is possible to impart sufficient weather resistance to the thermoplastic resin, depending on intended use.

In addition to the aforementioned thermoplastic resin, other resins may also be used in combination, in the range in which they do not impair the characteristics of the present invention. That is to say, the thermoplastic resin of the present invention may be provided in the form of a resin composition comprising multiple types of resins. The resin composition comprises at least a thermoplastic resin containing 1% to 100% by weight of the repeating unit represented by the above formula (1).

Examples of other resins are as follows:

polyethylene, polypropylene, polyvinyl chloride, polystyrene, a (meth)acrylic resin, an ABS resin, polyamide, polyacetal, polycarbonate (provided that it does not comprise the constituting unit (1)'), polyphenylene ether, polyester (provided that it does not comprise the constituting unit (1)'), polyester carbonate (provided that it does not comprise the constituting unit (1)'), polyphenylene sulfide, polyimide, polyether sulfone, polyether ether ketone, a fluorine resin, a cycloolefin polymer, an ethylene-vinyl acetate copolymer, an epoxy resin, a silicone resin, a phenolic resin, an unsaturated polyester resin, and polyurethane.

The content of other resins, which may be optionally comprised, is preferably 20 parts by mass or less, and more preferably 10 parts by mass or less, based on the total mass of the thermoplastic resin comprising the constituting unit derived from the dihydroxy compound of the above formula (1). If the content of other resins is too high, there may be a case where compatibility is deteriorated and the transparency of the resin composition is reduced.

(Physical Properties of Thermoplastic Resin)

The thermoplastic resin of the present invention has a tensile strength of preferably 70% or more, and more preferably 80% or more. The tensile strength of the resin can be measured by the method described in the after-mentioned Examples.

The thermoplastic resin of the present invention has a melt volume rate (MVR) at 260° C. of preferably 20 $cm^3/10$ min or more, more preferably 25 $cm^3/10$ min or more, and further preferably 30 $cm^3/10$ min or more. The melt volume rate (MVR) of the resin can be measured by the method described in the after-mentioned Examples.

(Molded Body)

Using the thermoplastic resin of the present invention, a molded body (e.g., an optical element) can be produced. Such a molded body can be molded, for example, by any given method, such as an injection molding method, a compression molding method, an extrusion molding method, or a solution casting method. The optical element produced using the thermoplastic resin or molded body according to the embodiment is preferably used for optical lenses, prisms, etc.

Molded products produced by these methods are used for various types of glazing uses, lenses for automobile lamps, lamp covers, optical lenses, OHP sheets, nameplates, display lights, etc. In addition, the films produced by such methods are preferably used as Placell substrates or phase difference films for the intended use of flat panel display substrates. For such Placell substrates, the films are used without being stretched. However, for the use as phase difference films, the films are subjected to stretch orientation, at least, in the uniaxial direction, so that the phase difference films can have optimal birefringence characteristics.

(Optical Lens)

Using the thermoplastic resin or molded body of the present invention, an optical lens can be produced. The optical lens produced using the thermoplastic resin according to the embodiment has a high refractive index and is excellent in heat resistance. Hence, the optical lens can be used in the field in which expensive glass lenses with a high refractive index have conventionally been used, such as a telescope, binoculars and a television projector, and thus, it is extremely useful. The optical lens is preferably used in the form of an aspherical lens, as necessary. Since a single aspherical lens is able to set the spherical aberration to be substantially zero, it is not necessary to remove the spherical aberration by a combination of multiple spherical lenses, and thus, it enables weight reduction and a reduction in production costs. Accordingly, such an aspherical lens is particularly useful as a camera lens, among optical lenses.

The optical lens is formed by any given method such as an injection method, a compression molding method, or an injection compression molding method. Using the thermoplastic resin according to the embodiment, an aspherical lens having a high refractive index and low birefringence, which is technically difficult to be processed from a glass lens, can be obtained more easily.

When the optical lens of the present invention is produced by injection molding, molding is preferably carried out under conditions of a cylinder temperature of 230° C. to 270° C. and a metallic mold temperature of 100° C. to 140° C. According to such molding conditions, an optical lens having excellent physical properties and also having the function of cutting the wavelength of an ultraviolet region can be obtained. Thus, when the produced optical lens is used as a lens for digital cameras, the influence of ultraviolet ray on an image sensor can be prevented without using an ultraviolet filter. In contrast, when the resin composition of the present invention is used as an ultraviolet filter, since it has extremely high transparency, the image quality of the taken photographs is not deteriorated, and clear photographs can be taken.

Moreover, since the resin of the embodiment has high fluidity, it can be a thin and small optical lens having a complicated shape. With regard to the specific size of the lens, the thickness of the central portion is 0.05 to 3.0 mm, more preferably 0.05 to 2.0 mm, and further preferably 0.1 to 2.0 mm. In addition, the diameter is 1.0 mm to 20.0 mm, more preferably 1.0 to 10.0 mm, and further preferably 3.0 to 10.0 mm.

On the surface of the optical lens of the present invention, a coating layer such as an anti-reflection layer or a hard coat layer may be established, as necessary. The anti-reflection layer may be a single layer or multiple layers. It may also be an organic matter or an inorganic matter, but it is preferably an inorganic matter. Specific examples include oxides or fluorides, such as silicon oxide, aluminum oxide, zirconium oxide, titanium oxide, cerium oxide, magnesium oxide or magnesium fluoride. Moreover, the optical lens of the present invention may also be molded by any given method such as metal molding, cutting, polishing, laser processing, electrical discharge machining, or edging. Among these methods, metal molding is more preferable.

In order to reduce the mixing of foreign matters into the optical lens to the minimum, the molding environment must be a low-dust environment, and the environment has a class of preferably 6 or less, and more preferably 5 or less.

(Optical Film)

Using the thermoplastic resin or molded body of the present invention, an optical film can be produced. Since the optical film produced using the thermoplastic resin according to the embodiment is excellent in transparency and heat resistance, it is preferably used for films for liquid crystal substrates, optical memory cards, etc.

It is to be noted that the "sheet" generally means a thin and flat product, the thickness of which is relatively small, in consideration of the length and width thereof, and that the "film" is a thin and flat product, the thickness of which is extremely small, in consideration of the length and width thereof, wherein the highest thickness is arbitrarily limited, and it is generally supplied in the form of a roll. In the present description, however, the "sheet" is not clearly distinguished from the "film." and they are both used to have the same meaning.

The film formed from the thermoplastic resin of the present invention has good heat resistance and hue. For example, the resin composition is dissolved in an organic solvent such as methylene chloride, tetrahydrofuran or dioxane, and is then molded into a casting film. Thereafter, a gas barrier film or a solvent-resistant film is applied to both sides of this film. Otherwise, together with a transparent conductive film or a polarizing plate, the film is preferably used as a film for liquid crystal substrates (Placell substrate), or as a liquid crystal display film such as a phase difference film. Specifically, the film can be advantageously used for various display devices such as a tablet, a smart phone or a handy terminal.

EXAMPLES

Hereinafter, the present invention will be more specifically described in the following examples. However, these examples are not intended to limit the scope of the present invention.

1. Production Example of Polycarbonate Resin and Polyester Carbonate Resin

A polycarbonate resin and a polyester carbonate resin were evaluated by the following methods.

(1) Melt Volume Rate (MVR):

MVR is an indicator showing the fluidity of a resin or a resin composition. The greater the value, the higher the fluidity that can be exhibited. The obtained polycarbonate resin is vacuum-dried at 120° C. for 4 hours, and thereafter, using Melt Indexer T-111 manufactured by Toyo Seiki Seisaku-sho, Ltd., MVR was measured under conditions of a temperature of 260° C. and a load of 2160 g.

(2) Purity, and Content of Impurities:

Using a liquid chromatograph-mass spectrometer (LC-MS), the weights of compounds represented by formula (1)-1, formula (1)-2, formula (A)-1, formula (A)-2, formula (B)-1, formula (B)-2, formula (C)-1, and formula (C)-2 were measured.

(i) BPEF (9,9-bis(4-(2-hydroxyethoxy)phenyl)fluorene)

20 mg of BPEF was dissolved in 10 ml of methanol to adjust it to 0.2 wt/vol %. Each sample was filtrated through a PTFE filter having a pore size of 0.20 μm, and thereafter, the compounds represented by the following formulae (1)-1, (A)-1, (B)-1 and (C)-1 were identified by using LC-MS. Subsequently, the purity was calculated based on the ratio of the peak area of each compound to the total peak area. The analysis was carried out under the following measurement conditions.

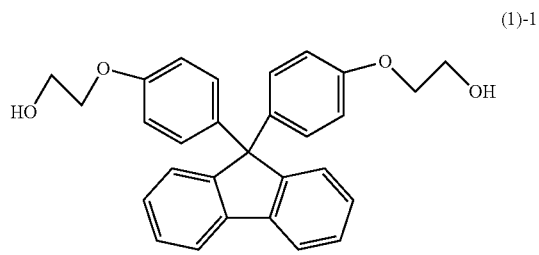

(1)-1

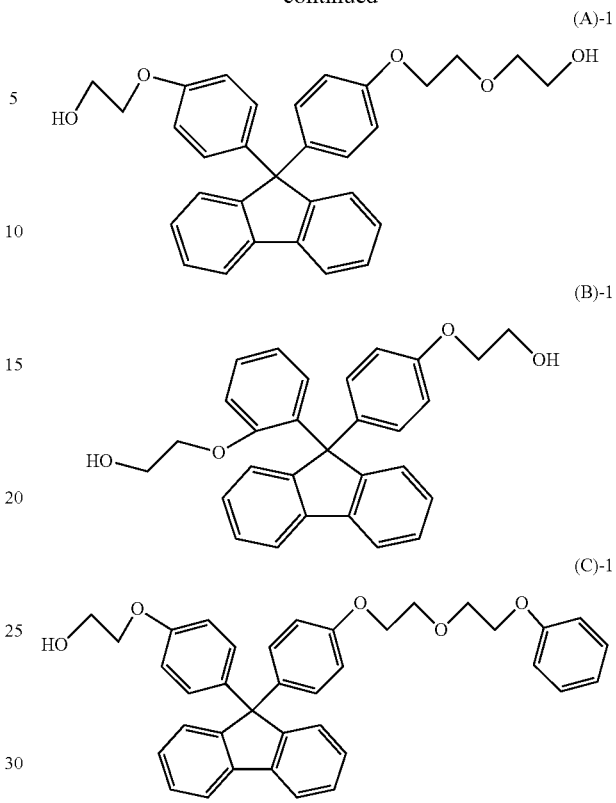

LC: Waters Acquity UPLC
   Flow rate: 0.5 ml/min
   Temperature: 60° C.
   Detector: UV 254 nm
   Column: Waters BEII phenyl (2.1 mm in diameter×100 mm in length, particle diameter: 1.7 um)
   Eluent: A mixed solution of A: water and B: methanol was used.
   Changes in the mixing ratio over time are shown below.
   B=60% (0-6 min)
   B=60%-95% (6-10 min)
   B=95%-100% (10-11 min)
   B=100% (11-12 min)
MS: Waters MALDI-Synapt HDMS
   Mode: MS
   Scanning range: 100-1500/0.3 sec
   Ionization method: ESI (+)
   Resolution: 8500 (V mode)
   Capillary voltage: 3 kV
   Code voltage: 30 V
   Trap collision energy: 5 V
   Transfer collision energy: 5 V
   Source temperature: 150° C.
   Desolvation temperature: 500° C.
   Amount injected: 2 μl
   Internal standard substance (mass correction): Leucine Enkephalin, 0.5 ng/ul
   Internal standard flow rate: 0.1 ml/min (ii) BPPEF (9,9-bis(4-(2-hydroxyethoxy)-3-phenylphenyl)fluorene)

20 mg of BPPEF was dissolved in 10 ml of methanol to adjust it to 0.2 wt/vol %. Each sample was filtrated through a PTFE filter having a pore size of 0.20 μm, and thereafter, the compounds represented by the following formulae (1)-2, (A)-2, (B)-2 and (C)-2 were identified by using LC-MS. Subsequently, the purity was calculated based on the ratio of the peak area of each compound to the total peak area. The analysis was carried out under the same analysis conditions as those for the above-described BPEF.

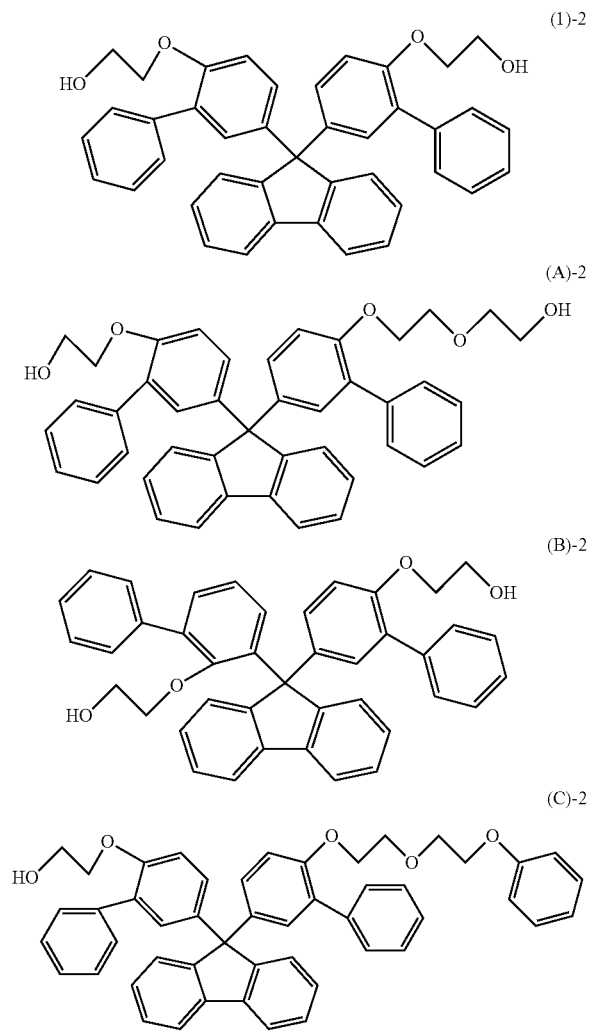

3) Tensile Strength:

The obtained polycarbonate resin was dissolved in dichloromethane to a concentration of 5% by weight, and was then casted on a cast plate, which had been confirmed to be horizontal. Subsequently, while the amount of the solvent evaporated from the cast solution was adjusted, the cast solution was volatized to obtain a transparent film having a thickness of approximately 100 μm. Thereafter, using a vacuum-dryer, the film was sufficiently dried at the glass transition temperature or lower. The thus obtained film was measured using an autograph AGS-100G manufactured by Shimadzu Corporation, in accordance with ASTMD882-61T.

Synthetic Example 1: BPEF-1

84.6 g of Fluorenone (0.47 moles), 394.2 g of phenoxyethanol (2.85 moles), 350 g of toluene, and 4.3 g of phosphotungstic acid from which crystal water had been removed by vacuum drying at 100° C., were added to a glass reactor comprising a water separator, which was equipped with a stirrer, a nitrogen blowing tube, a thermometer and a cooling pipe. The mixture was stirred for 11 hours under a toluene reflux, while the generated water was discharged to outside of the reaction system. Thereafter, to this reaction solution, 300 g of toluene was added, and the reaction mixture was then washed with 100 g of water at 80° C. Subsequently, the obtained solution was gradually cooled to room temperature, and the precipitated crystal was filtrated and was then dried to obtain [9,9-bis(4-(2-hydroxyethoxy) phenyl)fluorene] (BPEF-1) as a white crystal. As a result of an analysis by LC-MS, it was found that the purify of BPEF was 98.6%, the content of the compound (A)-1 was 6300 ppm, the content of the compound (B)-1 was 2300 ppm, and the content of the compound (C)-1 was 3100 ppm. The results of the analysis by LC-MS are shown in Table 1 and Table 3.

Synthetic Example 2: BPEF-2

300 g of Toluene was added to 200 g of the white crystal [9,9-bis(4-(2-hydroxyethoxy)phenyl)fluorene] obtained in the same manner as that in Synthetic Example 1, and the obtained mixture was then washed with 100 g of water at 80° C. two times. The obtained solution was gradually cooled to room temperature, and the precipitated crystal was filtrated and was then dried to obtain [9,9-bis(4-(2-hydroxyethoxy) phenyl)fluorene] (BPEF-2) as a white crystal. As a result of an analysis by LC-MS, it was found that the purify of BPEF was 99.5%, the content of the compound (A)-1 was 200 ppm, the content of the compound (B)-1 was 200 ppm, and the content of the compound (C)-1 was 800 ppm. The results of the analysis by LC-MS are shown in Table 1 and Table 3.

Synthetic Example 3: BPPEF-1

84.6 g of Fluorenone (0.47 moles), 485.1 g of 2-phenylphenoxyethanol (2.85 moles), 350 g of toluene, and 4.3 g of phosphotungstic acid from which crystal water had been removed by vacuum drying at 100° C., were added to a glass reactor comprising a water separator, which was equipped with a stirrer, a nitrogen blowing tube, a thermometer and a cooling pipe. The mixture was stirred for 11 hours under a toluene reflux, while the generated water was discharged to outside of the reaction system. Thereafter, to this reaction solution, 300 g of toluene was added, and the reaction mixture was then washed with 100 g of water at 80° C. Subsequently, the obtained solution was gradually cooled to room temperature, and the precipitated crystal was filtrated and was then dried to obtain 9,9-bis(4-(2-hydroxyethoxy)-3-phenylphenyl)fluorene (BPPEF-1) as a white crystal. As a result of an analysis by LC-MS, it was found that the purify of BPPEF-1 was 98.5%, the content of the compound (A)-2 was 8900 ppm, the content of the compound (B)-2 was 600 ppm, and the content of the compound (C)-2 was 800 ppm. The results of the analysis by LC-MS are shown in Table 2.

Synthetic Example 4: BPPEF-2

300 g of Toluene was added to 200 g of the white crystal 9,9-bis(4-(2-hydroxyethoxy)-3-phenylphenyl)fluorene (BPPEF-1) obtained in the same manner as that in Synthetic Example 3, and the obtained mixture was then washed with 100 g of water at 80° C. two times. The obtained solution was gradually cooled to room temperature, and the precipitated crystal was filtrated and was then dried to obtain 9,9-bis(4-(2-hydroxyethoxy)-3-phenylphenyl)fluorene (BPPEF-2) as a white crystal. As a result of an analysis by LC-MS, it was found that the purify of BPPEF was 99.2%, the content of the compound (A)-2 was 3000 ppm, the content of the compound (B)-2 was 200 ppm, and the content of the compound (C)-2 was 200 ppm. The results of the analysis by LC-MS are shown in Table 2.

Synthetic Example 5: BPPEF-3

300 g of Toluene was added to 200 g of the white crystal 9,9-bis(4-(2-hydroxyethoxy)-3-phenylphenyl)fluorene (BPPEF-1) obtained in the same manner as that in Synthetic Example 3, and the obtained mixture was then washed with 100 g of water at 80° C. five times. The obtained solution was gradually cooled to room temperature, and the precipitated crystal was filtrated and was then dried to obtain 9,9-bis(4-(2-hydroxyethoxy)-3-phenylphenyl)fluorene (BPPEF-3) as a white crystal. As a result of an analysis by LC-MS, it was found that the purify of BPPEF was 99.4%, the content of the compound (A)-2 was 900 ppm, the content of the compound (B)-2 was 200 ppm, and the content of the compound (C)-2 was 200 ppm. The results of the analysis by LC-MS are shown in Table 2.

<<Polycarbonate Resin>>

Example 1

21.000 g of BPEF-1 (0.048 moles) produced in Synthetic Example 1, 10.675 g of diphenyl carbonate (0.050 moles) (hereinafter also abbreviated as "DPC"), and 6 μmoles/moles sodium hydrogen carbonate used as a catalyst (wherein the sodium hydrogen carbonate was indicated with the number of moles based on BPEF, and was added in the state of a 0.1 wt % aqueous solution) were added into a 200-mL glass reactor equipped with a stirrer and a distillation apparatus, and the inside of the system was then replaced with a nitrogen atmosphere. Thereafter, the reactor was heated to 200° C. under 760) Torr. Ten minutes after initiation of the heating, complete dissolution of the raw materials was confirmed, and the mixed solution was then stirred for 20 minutes under the same conditions as described above. Subsequently, the degree of vacuum was adjusted to 200 Torr, and at the same time, the temperature was increased to 210° C. at a rate of 60° C./hr. During this operation, it was confirmed that phenol generated as a by-product started to be distillated. Thereafter, the temperature was retained at 210° C. for 20 minutes, and the reaction was carried out. Thereafter, while the pressure was reduced to 180 Torr, the temperature was increased to 230° C. at a rate of 60° C./hr. Ten minutes after completion of the temperature rising, while the temperature was retained at 230° C., the pressure was reduced to 150 Torr, and further, while the pressure was reduced to 130 Torr, the temperature was increased to 240° C. Thus, when the temperature rising was terminated, the pressure was reduced to 0.1 Torr over 30 minutes, while the temperature was retained at 240° C. Thereafter, the inside of the reaction system was retained at 240° C. under 0.1 Torr for 10 minutes, and it was then returned to ordinary pressure by introduction of nitrogen therein. The generated polycarbonate resin was collected. The MVR and tensile strength of the obtained resin are shown in Table 1.

Example 2

20.360 g of BPEF-1 (0.046 moles), 1.598 g of 2,2-bis(4-hydroxyphenyl)propane (BPA) (0.007 moles), 11.910 g of diphenyl carbonate (DPC) (0.056 moles), and 6 μmoles/moles sodium hydrogen carbonate used as a catalyst (wherein the sodium hydrogen carbonate was indicated with the number of moles based on a sum of BPEF and BPA, and was added in the state of a 0.1 wt % aqueous solution) were added into a 200-mL glass reactor equipped with a stirrer and a distillation apparatus, and the inside of the system was then replaced with a nitrogen atmosphere. Thereafter, the reactor was heated to 200° C. under 760 Torr. Ten minutes after initiation of the heating, complete dissolution of the raw materials was confirmed, and the mixed solution was then stirred for 20 minutes under the same conditions as described above. Subsequently, the degree of vacuum was adjusted to 200 Torr, and at the same time, the temperature was increased to 210° C. at a rate of 60° C./hr. During this operation, it was confirmed that phenol generated as a by-product started to be distillated. Thereafter, the temperature was retained at 210° C. for 20 minutes, and the reaction was carried out. Thereafter, while the pressure was reduced to 180 Torr, the temperature was increased to 230° C. at a rate of 60° C./hr. Ten minutes after completion of the temperature rising, while the temperature was retained at 230° C., the pressure was reduced to 150 Torr, and further, while the pressure was reduced to 130 Torr, the temperature was increased to 240° C. Thus, when the temperature rising was terminated, the pressure was reduced to 0.1 Torr over 30 minutes, while the temperature was retained at 240° C. Thereafter, the inside of the reaction system was retained at 240° C. under 0.1 Torr for 10 minutes, and it was then returned to ordinary pressure by introduction of nitrogen therein. The generated polycarbonate resin was collected. The MVR and tensile strength of the obtained resin are shown in Table 1.

Example 3

19.983 g of BPEF-1 (0.046 moles), 12.387 g of 2,2'-bis(2-hydroxyethoxy)-1,1'-binaphthalene (0.033 moles) (hereinafter also abbreviated as "BHEBN"), 17.321 g of DPC (0.081 mole), and 6 μmoles/moles sodium hydrogen carbonate used as a catalyst (wherein the sodium hydrogen carbonate was indicated with the number of moles based on a sum of BPEF and BHEBN, and was added in the state of a 0.1 wt 0% aqueous solution) were added into a 200-mL glass reactor equipped with a stirrer and a distillation apparatus, and the inside of the system was then replaced with a nitrogen atmosphere. Thereafter, the reactor was heated to 200° C. under 760 Torr. Ten minutes after initiation of the heating, complete dissolution of the raw materials was confirmed, and the mixed solution was then stirred for 110 minutes under the same conditions as described above. Subsequently, the degree of vacuum was adjusted to 20 Torr, and at the same time, the temperature was increased to 200° C. at a rate of 60° C./hr. During this operation, it was confirmed that phenol generated as a by-product started to be distillated. Thereafter, the temperature was retained at 200° C. for 20 minutes, and the reaction was carried out. Thereafter, the temperature was increased to 230° C. at a rate of 75° C./hr, and 10 minutes after completion of the temperature rising, while the temperature was retained at 230° C., the pressure was reduced to 1 Torr or less over 1 hour. Thereafter, the temperature was increased to 240° C. at a rate of 60° C./hr, and the reaction was further carried out at 240° C. under 0.2 Torr for 20 minutes. After completion of the reaction, the inside of the reaction system was returned to ordinary pressure by introduction of nitrogen therein, and the generated polycarbonate resin was then collected. The MVR and tensile strength of the obtained resin are shown in Table 1.

Example 4

20.410 g of BPPEF-1 (0.035 moles), 10.140 g of 2,2'-bis (2-hydroxyethoxy)-1,1'-binaphthalene (0.027 moles) (hereinafter also abbreviated as "BHEBN"), 13.380 g of DPC (0.0625 mole), and 6 µmoles/moles sodium hydrogen carbonate used as a catalyst (wherein the sodium hydrogen carbonate was indicated with the number of moles based on a sum of BPEF and BHEBN, and was added in the state of a 0.1 wt % aqueous solution) were added into a 200-mL glass reactor equipped with a stirrer and a distillation apparatus, and the inside of the system was then replaced with a nitrogen atmosphere. Thereafter, the reactor was heated to 200° C. under 760 Torr. Ten minutes after initiation of the heating, complete dissolution of the raw materials was confirmed, and the mixed solution was then stirred for 110 minutes under the same conditions as described above. Subsequently, the degree of vacuum was adjusted to 20 Torr, and at the same time, the temperature was increased to 200° C. at a rate of 60° C./hr. During this operation, it was confirmed that phenol generated as a by-product started to be distillated. Thereafter, the temperature was retained at 200° C. for 20 minutes, and the reaction was carried out. Thereafter, the temperature was increased to 230° C. at a rate of 75° C./hr, and 10 minutes after completion of the temperature rising, while the temperature was retained at 230° C., the pressure was reduced to 1 Torr or less over 1 hour. Thereafter, the temperature was increased to 240° C. at a rate of 60° C./hr, and the reaction was further carried out at 240° C. under 0.2 Torr for 20 minutes. After completion of the reaction, the inside of the reaction system was returned to ordinary pressure by introduction of nitrogen therein, and the generated polycarbonate resin was then collected. The MVR and tensile strength of the obtained resin are shown in Table 2.

Example 5

The reaction was carried out in the same manner as that of Example 4, with the exception that BPPEF-2 obtained in Synthetic Example 4 was used. The MVR and tensile strength of the obtained resin are shown in Table 2.

Comparative Example 1

The reaction was carried out in the same manner as that of Example 1, with the exception that BPEF-2 obtained in Synthetic Example 2 was used. The MVR and tensile strength of the obtained resin are shown in Table 1.

Comparative Example 2

The reaction was carried out in the same manner as that of Example 2, with the exception that BPEF-2 obtained in Synthetic Example 2 was used. The MVR and tensile strength of the obtained resin are shown in Table 1.

Comparative Example 3

The reaction was carried out in the same manner as that of Example 3, with the exception that BPEF-2 obtained in Synthetic Example 2 was used. The MVR and tensile strength of the obtained resin are shown in Table 1.

Comparative Example 4

The reaction was carried out in the same manner as that of Example 4, with the exception that BPPEF-3 obtained in Synthetic Example 5 was used. The MVR and tensile strength of the obtained resin are shown in Table 2.

<<Polyester Carbonate Resin>>

Example 6

40,000 g of BPEF-1 (0.091 moles) produced in Synthetic Example 1, 4.4000 g of dimethyl terephthalate (0.023 moles) (hereinafter also abbreviated as "DMT"), 15.630 g of diphenyl carbonate (DPC) (0.073 moles), and $1 \times 10^{-3}$ g of titanium butoxide used as a catalyst were added into a 200-mL glass reactor equipped with a stirrer and a distillation apparatus, and the inside of the system was then replaced with a nitrogen atmosphere. Thereafter, the reactor was heated to 190° C. under 760 Torr, and were then stirred for 20 minutes under the same conditions as described above. Subsequently, the degree of vacuum was adjusted to 200 Torr, and at the same time, the temperature was increased to 260° C. at a rate of 60° C./hr. Ten minutes after completion of the temperature rising, while the temperature was retained at 260° C., the pressure was reduced to 0.1 Torr over 60 minutes. Thereafter, the inside of the reaction system was retained at 260° C. under 0.1 Torr for 10 minutes, and it was then returned to ordinary pressure by introduction of nitrogen therein. The generated polycarbonate resin was collected. The MVR and tensile strength of the obtained resin are shown in Table 3.

Example 7

The reaction was carried out in the same manner as that of Example 6, with the exception that the raw materials were changed to 32.000 g of BPEF-1 (0.073 moles) produced in Synthetic Example 1, 4.4000 g of dimethyl 2,6-naphthalenedicarboxylate (0.018 moles) (hereinafter also abbreviated as "NDCM"), 12.500 g of DPC (0.058 moles), and $1 \times 10^{-3}$ g of titanium butoxide used as a catalyst. The MVR and tensile strength of the obtained resin are shown in Table 3.

Comparative Example 5

The reaction was carried out in the same manner as that of Example 6, with the exception that BPEF-2 produced in Synthetic Example 2 was used. The MVR and tensile strength of the obtained resin are shown in Table 3.

TABLE 1

| | | BPEF | | | | Physical properties of resin | |
|---|---|---|---|---|---|---|---|
| | Type | BPEF purity % | (A)-1 content ppm | (B)-1 content ppm | (C)-1 content ppm | Comonomer | MVR (cm³/10 min) | Tensile strength (MPa) |
| Ex. 1 | BPEF-1 | 98.6 | 6300 | 2300 | 3100 | — | 30 | 72 |
| Ex. 1 | BPEF-1 | 98.6 | 6300 | 2300 | 3100 | BPA | 30 | 72 |
| Ex. 1 | BPEF-1 | 98.6 | 6300 | 2300 | 3100 | BHEBN | 31 | 88 |
| Comp. Ex. 1 | BPEF-2 | 99.5 | 200 | 200 | 800 | — | 27 | 66 |
| Comp. Ex. 2 | BPEF-2 | 99.5 | 200 | 200 | 800 | BPA | 28 | 69 |
| Comp. Ex. 3 | BPEF-2 | 99.5 | 200 | 200 | 800 | BHEBN | 29 | 80 |

TABLE 2

| | | BPPEF | | | | Physical properties of resin | |
|---|---|---|---|---|---|---|---|
| | Type | BPPEF purity % | (A)-2 content ppm | (B)-2 content ppm | (C)-2 content ppm | Comonomer | MVR (cm³/10 min) | Tensile strength (MPa) |
| Ex. 4 | BPPEF-1 | 98.5 | 8900 | 600 | 800 | BHEBN | 55 | 84 |
| Ex. 5 | BPPEF-2 | 99.2 | 3000 | 200 | 200 | BHEBN | 51 | 78 |
| Comp. Ex. 4 | BPPEF-3 | 99.4 | 900 | 200 | 200 | BHEBN | 50 | 69 |

TABLE 3

| | | BPEF | | | | Physical properties of resin | |
|---|---|---|---|---|---|---|---|
| | Type | BPEF purity % | (A)-1 content ppm | (B)-1 content ppm | (C)-1 content ppm | Comonomer | MVR (cm³/10 min) | Tensile strength (MPa) |
| Ex. 6 | BPEF-1 | 98.6 | 6300 | 2300 | 3100 | DMT | 30 | 90 |
| Ex. 7 | BPEF-1 | 98.6 | 6300 | 2300 | 3100 | NDCM | 30 | 88 |
| Comp. Ex. 5 | BPEF-2 | 99.5 | 200 | 200 | 800 | DMT | 30 | 69 |

BPEF: 9,9-bis(4-(2-hydroxyethoxy)phenyl)fluorene
BPPEF: 9,9-bis(4-(2-hydroxyethoxy)-3-phenylphenyl)fluorene
BPA: 2,2-bis(4-hydroxyphenyl)propane
BHEBN: 2,2'-bis(2-hydroxyethoxy)-1,1'-binaphthalene
DMT: dimethyl terephthalate
NDCM: dimethyl 2,6-naphthalenedicarboxylate From the above Tables 1 and 2, it is found that the polycarbonate resins obtained in Examples 1 to 5, in which the raw materials comprising the compounds of the formulae (A) to (C) in an amount of 1,500 ppm or more have been used, have a high melt volume rate (MVR) and high tensile strength.

On the other hand, it is confirmed that the polycarbonate resins obtained in Comparative Examples 1 to 3, in which the total content of the compounds of the formulae (A) to (C) has been less than 1,500 ppm, have a reduction in the melt volume rate (MVR) (a reduction in fluidity) and a reduction in the tensile strength, in comparison to Examples 1 to 3, in which a dihydroxy compound having the same structure is used.

From the above Table 3, it is found that the polyester carbonate resins obtained in Examples 6 and 7, in which the raw materials comprising the compounds of the formulae (A) to (C) in an amount of 1,500 ppm or more have been used, have a high melt volume rate (MVR) and high tensile strength.

On the other hand, it is confirmed that the polyester carbonate resin obtained in Comparative Example 5, in which the total content of the compounds of the formulae (A) to (C) has been less than 1,500 ppm, has a reduction in the tensile strength, in comparison to Example 6, in which a dihydroxy compound and a comonomer having the same structure have been used.

2. Production Example of Film

A film was evaluated by the following methods.
(1) Total Light Transmittance and Haze
Total light transmittance and haze were measured using a hazemeter ("HM-150," manufactured by MURAKAMI COLOR RESEARCH LABORATORY CO., Ltd.), in accordance with JIS K-7361 and JIS K-7136.
(2) Glass Transition Temperature
Glass transition temperature was measured using a differential thermal scanning calorimeter (DSC) (measuring device: DSC7000X, manufactured by Hitachi High-Tech Science Corporation DSC7000X).
(3) Surface Shape
The surface shape of a light diffusion film was evaluated using arithmetic average roughness. Arithmetic average roughness was obtained by preparing a roughness curve using a small surface roughness measuring device ("SURFTEST SJ-210," manufactured by Mitutoyo Corporation), and then calculating the roughness as follows. That is, the range of a reference length (1) (average line direction) was extracted from the prepared roughness curve, and thereafter, X axis was set in the direction of an average line of this extracted portion, whereas Y axis was set in a direction perpendicular to the X axis. When the roughness curve was represented by y=f(x), the value (μm) obtained by the following expression was defined as an arithmetic average roughness (Ra). Herein, the term "reference length (1) (average line direction)" is used to mean the reference length of a roughness parameter according to JIS B 0601: 2001 (ISO 4287: 1997).

$$Ra = \frac{1}{\ell} \int_0^\ell |f(x)| dx$$

(5) Refractive Index

The refractive index of a film having a thickness of 0.1 mm was measured using an Abbe's refractometer according to the method of JIS-K-7142 (23° C., wavelength: 589 nm).
(6) Abbe Number (ν)

The refractive indexes of a film having a thickness of 0.1 mm at 23° C. at wavelengths of 486 nm, 589 nm and 656 nm were measured using an Abbe's refractometer, and thereafter, the Abbe number (ν) thereof was further calculated according to the following formula:

$$\nu = (nD-1)/(nF-nC)$$

nD: refractive index at a wavelength of 589 nm
nC: refractive index at a wavelength of 656 nm
nF: refractive index at a wavelength of 486 nm
(7) Melt Volume Rate (MVR)

The obtained resin was vacuum-dried at 120° C. for 4 hours, and thereafter, the melt volume rate (MVR) of the resin was measured using Melt Indexer T-111 manufactured by Toyo Seiki Seisaku-sho, Ltd., under conditions of a temperature of 260° C. and a load of 2160 g.

Example 8

The reaction was carried out in the same manner as that of Example 3, with the exceptions that the amounts of BHEBN, BPEF-1, diphenyl carbonate (DPC), and sodium hydrogen carbonate were changed to 6.20 kg (16.56 moles), 10.00 kg (22.80 moles), 8.67 kg (40.46 moles), and 1.98×10$^{-2}$ g (2.36×10$^{-4}$ moles), respectively, and that the size of the reactor was changed to 50 L. After completion of the reaction, nitrogen was introduced into the reactor, and the generated polycarbonate resin was extracted, while it was pelletized.

The obtained pellets were subjected to melt extrusion at 280° C., using a 26-mm biaxial extruder and a T die. The extruded melted film was nipped between a first cooling roll made of silicon rubber, having a diameter of 200 mm, and a second cooling roll made of metal, having a diameter of 200 mm, which had been subjected to mat-processing (arithmetic average roughness of surface: 3.2 μm). The mat pattern was formed on the surface of the film, and the film was then cooled. Then, the film was further passed through a third cooling roll made of metal, the surface of which had a mirror structure, and while the film was drawn by a draw-off roll, it was molded into a film, one surface of which was matted. During this operation, the temperature of the first cooling roll was set at 40° C. the temperature of the second cooling roll was set at 130° C. the temperature of the third cooling roll was set at 130° C., and the speed of the cooling rolls was adjusted, so that the arithmetic average roughness of the film surface was adjusted to be 3.0 μm.

Example 9

The reaction was carried out in the same manner as that of Example 2, with the exceptions that the amounts of BPEF-1,2,2-bis(4-hydroxyphenyl)propane, DPC, and sodium hydrogen carbonate were changed to 14.99 kg (34.18 moles), 1.18 kg (5.15 moles), 8.79 kg (41.02 moles), and 1.98×10$^{-2}$ g (2.36×10$^{-4}$ moles), respectively, and that the size of the reactor was changed to 50 L. The obtained pellets were molded in the same manner as that of Example 8.

Comparative Example 6

Using the pellets of a polycarbonate resin (Iupilon H-4000, manufactured by Mitsubishi Engineering-Plastics Corporation; polycarbonate consisting of bisphenol A (BPA-HOMO-PC)), a film was produced in the same manner as that of Example 8.

The evaluation results of the films obtained in Examples 8 and 9 and Comparative Example 6 are shown in Table 4.

TABLE 4

|  | Example 8 | Example 9 | Comp. Example 6 |
|---|---|---|---|
| Film thickness (μm) | 220 | 230 | 250 |
| Haze (%) | 88.6 | 87 | 76 |
| Total light transmittance %) | 86.1 | 87.6 | 89.1 |
| Arithmetic average roughness (μm) | 3 | 2.9 | 1.8 |
| Glass transition temperature (° C.) | 134 | 145 | 142 |
| MVR 260° C. cm$^3$/10 min | 32 | 30 | 33 |
| Abbe number | 21.5 | 23.9 | 30.1 |
| Refractive index | 1.651 | 1.636 | 1.584 |

From the above Table 4, it is confirmed that the films produced using the polycarbonate resin of the present invention (Examples 8 and 9) have high haze and excellent transparency, in comparison to the conventional bisphenol A-based polycarbonate resin (Comparative Example 6) having fluidity (MVR) equivalent to Examples 8 and 9, and further exhibit a low Abbe number and a high refractive index.

3. Production of Optical Lens

Injection molded products were produced as optical lenses in the following examples and comparative examples according to the following method.

Ten thin molded products were produced using a metallic mold capable of forming a lens having a curvature radius on the convex surface of 5.73 mm, a curvature radius on the concave surface of 3.01 mm, a diameter of 4.5 mm, a diameter of a lens portion of 3 mm, and a central thickness of a lens of 0.20 mm, and employing an injection molding machine ROBOSHOT S-2000i30A, manufactured by FANUC CORPORATION, at a resin temperature of 260° C., a metallic mold temperature Tg of −5° C., and a sustaining pressure of 600 kgf/cm$^2$.

The obtained optical lenses were evaluated by the following methods.
[Evaluation of Birefringence]

The birefringence of the obtained molded products was measured using a birefringence meter (KOBRA (registered trademark)—CCD/X; manufactured by Oji Scientific Instruments), and a comparison was then made in terms of the value of retardation in the central portion of a lens at a measurement wavelength of 650 nm. The smaller the retardation value, the more excellent the low birefringence property that can be obtained. A retardation value of less than 20 was evaluated to be A, a retardation value of 20 or more and less than 40 was evaluated to be B, a retardation value of 40 or more and less than 60 was evaluated to be C, and a retardation value of 60 or more was evaluated to be D.

[Evaluation of Weld Line]

The obtained molded products were each observed under a microscope, and the length of a weld line generated in an anti-gate direction was measured. The length of the weld line that was less than 0.1 mm was evaluated to be A, 0.1 mm or more and less than 0.3 mm was evaluated to be B, 0.3 mm or more and less than 0.5 mm was evaluated to be C, and 0.5 mm or more was evaluated to be D.

Example 10

An injection molded product was produced using the polycarbonate resin obtained in Example 1. The results of the birefringence evaluation and weld line evaluation of the obtained molded product are shown in Table 5.

Example 11

An injection molded product was produced using the polycarbonate resin obtained in Example 2. The results of the birefringence evaluation and weld line evaluation of the obtained molded product are shown in Table 5.

Example 12

An injection molded product was produced using the polycarbonate resin obtained in Example 3. The results of the birefringence evaluation and weld line evaluation of the obtained molded product are shown in Table 5.

Example 13

An injection molded product was produced using the polycarbonate resin obtained in Example 4. The results of the birefringence evaluation and weld line evaluation of the obtained molded product are shown in Table 5.

Example 14

An injection molded product was produced using the polycarbonate resin obtained in Example 5. The results of the birefringence evaluation and weld line evaluation of the obtained molded product are shown in Table 5.

Comparative Example 7

An injection molded product was produced using the polycarbonate resin obtained in Comparative Example 1. The results of the birefringence evaluation and weld line evaluation of the obtained molded product are shown in Table 5.

Comparative Example 8

An injection molded product was produced using the polycarbonate resin obtained in Comparative Example 2. The results of the birefringence evaluation and weld line evaluation of the obtained molded product are shown in Table 5.

Comparative Example 9

An injection molded product was produced using the polycarbonate resin obtained in Comparative Example 3. The results of the birefringence evaluation and weld line evaluation of the obtained molded product are shown in Table 5.

Comparative Example 10

An injection molded product was produced using pellets of a polycarbonate resin (Iupilon H-4000 manufactured by Mitsubishi Engineering-Plastics Corporation; polycarbonate consisting of bisphenol A (BPA-HOMO-PC)). The results of the birefringence evaluation and weld line evaluation of the obtained molded product are shown in Table 5.

TABLE 5

| | Birefringence | Evaluation of weld line |
|---|---|---|
| Example 10 | B | A |
| Example 11 | A | A |
| Example 12 | B | B |
| Example 13 | B | B |
| Example 14 | B | B |
| Comp. Example 7 | B | C |
| Comp. Example 8 | C | C |
| Comp. Example 9 | B | D |
| Comp. Example 10 | D | A |

From the above Table 5, the optical lenses produced using the polycarbonate resin of the present invention (Examples 10 to 14) had low birefringence (evaluation of A or B). Moreover, the optical lenses of the present invention had a short weld line, because of good fluidity of the polycarbonate resin used in the production thereof (evaluation of A or B).

On the other hand, the optical lenses (Comparative Examples 7 to 9) produced using the polycarbonate resins of Comparative Examples 1 to 3, in which the total content of the compounds of the formulae (A) to (C) was less than 1,500 ppm, had a long weld line. Furthermore, in the case of the optical lens (Comparative Example 10) produced using the conventional bisphenol A-based polycarbonate resin having equivalent fluidity (MVR), the weld line evaluation was equivalent to the optical lenses of Examples 10 to 14, but the birefringence thereof was high (evaluation of D).

The invention claimed is:

1. A method for producing a thermoplastic resin by reacting reactants comprising a dihydroxy compound, wherein the dihydroxy compound comprises
a dihydroxy compound represented by the following formula (1), and
at least one of a compound represented by the following formula (A), a compound represented by the following formula (B), and a compound represented by the following formula (C), wherein
the total weight of the compound represented by the formula (A), the compound represented by the formula (B), and the compound represented by the formula (C) is 1,500 ppm or more, based on the weight (100 parts by weight) of the dihydroxy compound represented by the formula (1),

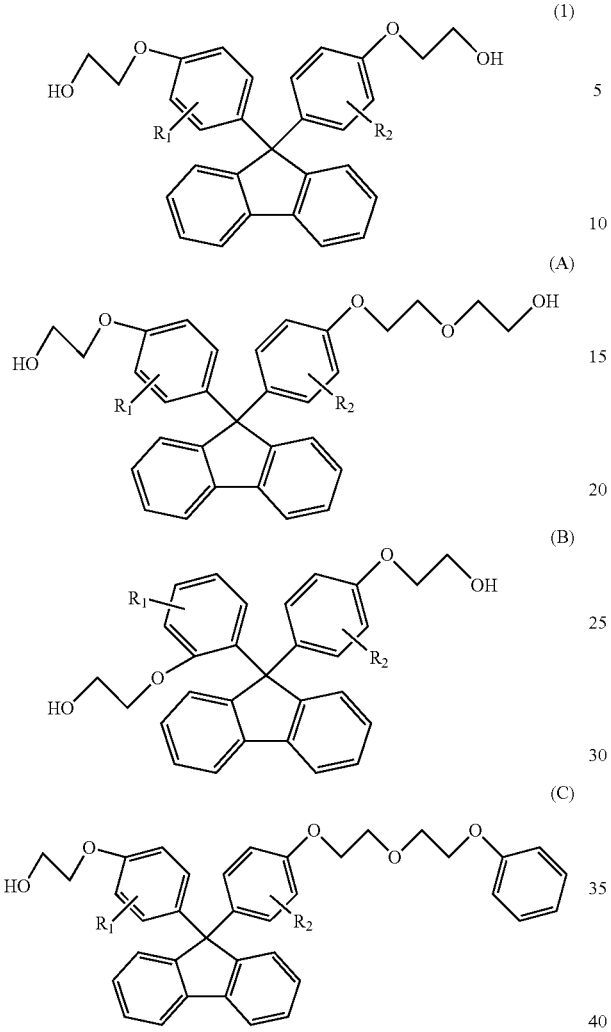

wherein $R_1$ and $R_2$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, and an aryloxy group containing 6 to 20 carbon atoms.

2. The production method according to claim 1, wherein the weight of the compound represented by the formula (A) in the dihydroxy compound is 1,000 ppm or more, based on the weight (100 parts by weight) of the dihydroxy compound represented by the formula (1).

3. The production method according to claim 1, wherein the weight of the compound represented by the formula (B) in the dihydroxy compound is 200 ppm or more, based on the weight (100 parts by weight) of the dihydroxy compound represented by the formula (1).

4. The production method according to claim 1, wherein the weight of the compound represented by the formula (C) in the dihydroxy compound is 200 ppm or more, based on the weight (100 parts by weight) of the dihydroxy compound represented by the formula (1).

5. The production method according to claim 1, wherein the dihydroxy compound further comprises at least one of a dihydroxy compound represented by the following formula (2) and a dihydroxy compound represented by the following formula (3):

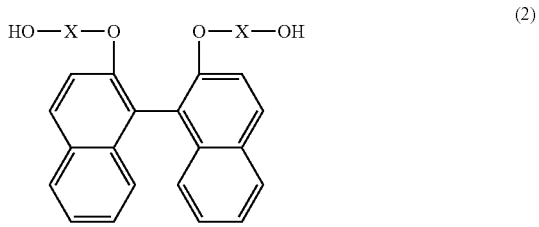

wherein X each independently represents an alkylene group containing 1 to 4 carbon atoms,

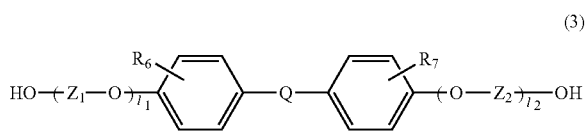

wherein $R_6$ and $R_7$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, an aryloxy group containing 6 to 20 carbon atoms, and a halogen atom;

$Z_1$ and $Z_2$ are each independently selected from the group consisting of an alkylene group containing 1 to 8 carbon atoms, a cycloalkylene group containing 6 to 10 carbon atoms, and an arylene group containing 6 to 10 carbon atoms;

$l_1$ and $l_2$ each independently represent an integer of 0 to 5;

Q represents a single bond or is selected from the group consisting of:

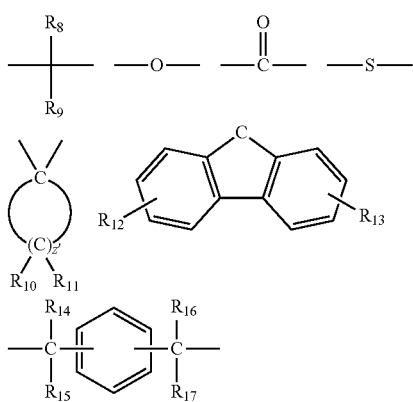

wherein $R_8$, $R_9$, and $R_{14}$ to $R_{17}$ are each independently selected from the group consisting of a hydrogen atom, an alkyl group containing 1 to 10 carbon atoms, and a phenyl group;

$R_{10}$ to $R_{13}$ each independently represent a hydrogen atom or an alkyl group containing 1 to 5 carbon atoms;

Z' represents an integer of 3 to 11; and $R_6$ and $R_7$ may be identical to or different from each other.

6. The production method according to claim 1, wherein X represents an ethylene group.

7. The production method according to claim 1, wherein the thermoplastic resin is selected from the group consisting of a polycarbonate resin, a polyester resin, and a polyester carbonate resin.

8. The production method according to claim 7, wherein the thermoplastic resin is a polycarbonate resin.

9. The production method according to claim 1, wherein the reactants further comprise carbonic acid diester.

10. The production method according to claim 7, wherein the thermoplastic resin is a polyester carbonate resin, the reactants comprise the dihydroxy compound; carbonic acid diester; and dicarboxylic acid comprising at least one selected from terephthalic acid, 2,6-naphthalenedicarboxylic acid, and fluorene-9,9-dipropionic acid, or derivative of the dicarboxylic acid; and the molar ratio between the dihydroxy compound and the dicarboxylic acid or a derivative of the dicarboxylic acid (dihydroxy compound/dicarboxylic acid or derivative of the dicarboxylic acid) is 20/80 to 95/5.

11. The production method according to claim 1, wherein tensile strength is 70% or more.

12. A method for producing a molded body, comprising a step of molding a thermoplastic resin obtained by the production method according to claim 1.

13. A method for producing an optical material, which is characterized in that it uses a thermoplastic resin obtained by the production method according to claim 1.

14. A method for producing an optical lens, which is characterized in that it uses a thermoplastic resin obtained by the production method according to claim 1.

15. A method for producing an optical film, which is characterized in that it uses a thermoplastic resin obtained by the production method according to claim 1.

16. The production method according to claim 1, wherein $R_1$ and $R_2$ is each independently selected from the group consisting of an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, and an aryloxy group containing 6 to 20 carbon atoms.

* * * * *